United States Patent
Santilli et al.

(10) Patent No.: US 10,686,590 B2
(45) Date of Patent: Jun. 16, 2020

(54) METHODS AND SYSTEMS FOR CROWDSOURCING AN OUTCOME TO AN ISSUE

(71) Applicants: Joseph Santilli, Atlanta, GA (US); Benjamin Casha, Fort Myers, FL (US)

(72) Inventors: Joseph Santilli, Atlanta, GA (US); Benjamin Casha, Fort Myers, FL (US)

( * ) Notice: Subject to any disclaimer, the term of this patent is extended or adjusted under 35 U.S.C. 154(b) by 233 days.

(21) Appl. No.: 15/854,582

(22) Filed: Dec. 26, 2017

(65) Prior Publication Data
US 2019/0020471 A1 Jan. 17, 2019

Related U.S. Application Data

(60) Provisional application No. 62/438,870, filed on Dec. 23, 2016.

(51) Int. Cl.
| | |
|---|---|
| G06F 21/60 | (2013.01) |
| H04L 9/32 | (2006.01) |
| G06F 21/30 | (2013.01) |
| H04L 9/06 | (2006.01) |
| H04L 29/08 | (2006.01) |
| H04L 9/08 | (2006.01) |
| H04L 9/00 | (2006.01) |
| G06F 16/23 | (2019.01) |

(52) U.S. Cl.
CPC ............ *H04L 9/0643* (2013.01); *G06F 16/23* (2019.01); *H04L 9/006* (2013.01); *H04L 9/0825* (2013.01); *H04L 9/3226* (2013.01); *H04L 9/3239* (2013.01); *H04L 9/3247* (2013.01); *H04L 67/10* (2013.01); *H04L 67/306* (2013.01); *H04L 2209/38* (2013.01); *H04L 2209/463* (2013.01)

(58) Field of Classification Search
CPC . G06F 21/60; G06F 21/30; H04L 9/30; H04L 63/12; H04L 9/32
See application file for complete search history.

(56) References Cited

U.S. PATENT DOCUMENTS

2016/0027229 A1* 1/2016 Spanos .................. G07C 13/00 705/51

* cited by examiner

*Primary Examiner* — Izunna Okeke
(74) *Attorney, Agent, or Firm* — Terrence J. Edwards; TechLaw Ventures, PLLC

(57) ABSTRACT

The disclosure extends to methods, systems, and devices for crowdsourcing an outcome to an issue through a platform. The method includes receiving voting data comprising a vote for an election from a user associated with an account facilitated by a voting server. The method includes generating a record for storing the voting data, wherein the record includes: a hashed identifier assigned to the user of the account, a public key assigned to the user of the account, and the voting data. The method includes broadcasting the record to a distributed network and storing the record on a blockchain database.

39 Claims, 13 Drawing Sheets

METHODS AND SYSTEMS FOR CROWDSOURCING AN OUTCOME TO AN ISSUE

CROSS-REFERENCE TO RELATED APPLICATIONS

This application claims the benefit of U.S. Provisional Patent Application No. 62/438,870 filed on Dec. 23, 2016, which is incorporated by reference herein in its entirety, including but not limited to those portions that specifically appear hereinafter, the incorporation by reference being made with the following exception: In the event that any portion of the above-referenced application is inconsistent with this application, this application supersedes the above-referenced application.

FEDERAL SPONSORED RESEARCH DEVELOPMENT

No applicable.

BACKGROUND

The disclosure relates generally to methods, systems, and devices for crowdsourcing an outcome to an issue, and particularly for secure and verifiable voting and determining a course of action based on a plurality of votes. The disclosure relates to receiving votes from a plurality of sources, verifying the authenticity of each vote, permitting each voter to verify that a vote was accepted, and determining an outcome based on the votes. The disclosure relates to methods, systems, and devices for crowdsourcing a best course of an action on an issue.

Current voting systems, including paper ballot or electronic ballot systems that require voters to vote in person or mail in a ballot, are costly, time-consuming, inconvenient, and difficult to verify and authenticate. Voters do not know for certain whether their vote was properly cast and counted, and the authenticity of an election may be called into question. Voters may be required to wait in long lines to cast their vote, and this can be costly in both time and resources for voters and for organizations funding the election. Voters often cannot change their vote after they have voted, even if the voter receives new information about an issue or candidate after the voter has cast a vote. Thus, it is advantageous to create a secure and verifiable system for crowdsourcing an outcome to an issue that is easy to use, less costly than current systems, and easily authenticated.

The features and advantages of the disclosure will be set forth in the description, which follows, and in part will be apparent from the description, or may be learned by the practice of the disclosure without undue experimentation. The features and advantages of the disclosure may be realized and obtained by means of the instruments and combinations particularly pointed out in the appended claims. Any discussion of documents, acts, materials, devices, articles or the like, which has been included in the specification is not to be taken as an admission that any or all of these matters form part of the prior art base, or were common general knowledge in the field relevant to the disclosure as it existed before the priority date of each claim of this disclosure.

BRIEF DESCRIPTION OF THE DRAWINGS

Non-limiting and non-exhaustive implementations of the disclosure are described with reference to the following figures, wherein like reference numerals refer to like parts throughout the various views unless otherwise specified. Advantages of the disclosure will become better understood with regard to the following description and accompanying drawings where.

DETAILED DESCRIPTION

Figure 1:
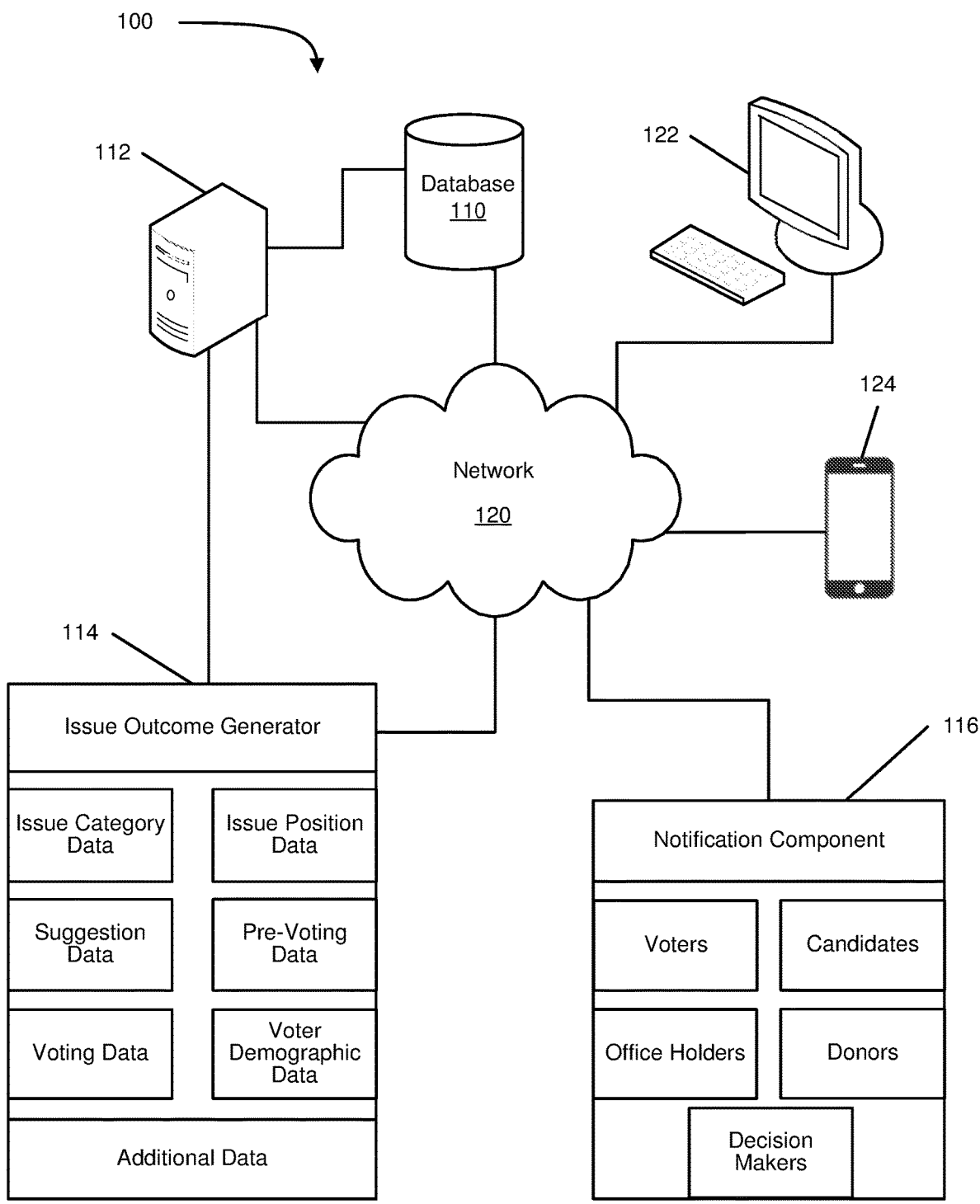
FIG. 1 illustrates a schematic diagram of a voting system made in accordance with the teachings and principles of the disclosure.

The disclosure extends to methods, systems, and devices for crowdsourcing a decision or a best course of action through a secure and verifiable voting platform. The voting system disclosed in the present application allows for a high degree of transparency. The voting platform permits a third party to audit an election and ensure that all votes are properly cast and counted. The voting system enables a voter to ensure that all votes have been properly and accurately account. The voting system permits a voter to revise a previously cast vote before voting has closed on an election. The voting system provides a mechanism to see all items being voted on with a complete revision history and a tracking of the parties involved with each election. The voting system provides accountability and security when individuals create and see an issue such as a bill, proposal, petition, amendment, and so forth that may be advanced through the voting process.

In the following description of the disclosure, reference is made to the accompanying drawings, which form a part hereof, and in which is shown by way of illustration specific implementations in which the disclosure may be practiced. It is understood that other implementations may be utilized and structural changes may be made without departing from the scope of the disclosure.

Many organizations, including government organizations, political organizations, and business organizations, would benefit from a system that enables a plurality of people to engage with politicians, officers, and decision makers. Such a system would enable politicians, officers, and decision makers to engage with people who are affected by their decisions and to understand how those people would like the politician, officer, or decision maker to proceed with a particular issue. Many organizations would also benefit from a system that enabled the organization to provide transparency in operations and communications to a plurality of persons. Such a system may enable people to view, for example, schedules, progress reports, background information, and communications by politicians, officers, or decision makers in the organization. Further, many organizations would benefit from a secure and verifiable voting system that may ensure votes are properly cast and counted and the election or outcome may be authenticated.

Verifiable online transactions, such as online currency transactions, have been developed through blockchain network technology. Blockchain networks may include a plurality of computers storing a decentralized database of transactions, and wherein each computer may verify the authenticity of the transactions. Blockchain network technology may be utilized to store votes and ensure the authenticity of the votes. It is an advantageous improvement to the art to utilize blockchain network technology to store a database of votes in a publicly accessible ledger of transactions and to enable voters to cast a vote from, for example, a computer or mobile device, and verify that the vote was properly cast and counted.

Before the methods, systems and devices for crowdsourcing a decision through a secure and verifiable voting platform are disclosed and described, it is to be understood that this disclosure is not limited to the particular configurations, process steps, and materials disclosed herein as such configurations, process steps, and materials may vary somewhat. It is also to be understood that the terminology employed herein is used for the purpose of describing particular implementations only and is not intended to be limiting since the scope of the disclosure will be limited only by the appended claims and equivalents thereof.

In describing and claiming the disclosure, the following terminology will be used in accordance with the definitions set out below.

It must be noted that, as used in this specification and the appended claims, the singular forms "a," "an," and "the" include plural referents unless the context clearly dictates otherwise.

As used herein, the terms "comprising," "including," "containing," "characterized by," and grammatical equivalents thereof are inclusive or open-ended terms that do not exclude additional, unrecited elements or method steps.

As used herein, the phrase "consisting of" and grammatical equivalents thereof exclude any element, step, or ingredient not specified in the claim.

As used herein, the phrase "consisting essentially of" and grammatical equivalents thereof limit the scope of a claim to the specified materials or steps and those that do not materially affect the basic and novel characteristic or characteristics of the claimed disclosure.

As used herein, the term "election" is defined broadly to encompass queries, questions, surveys, polls, government elections, public opinion studies, issues, and so forth. In an embodiment, an election refers to an election for a public office such as a government position. In an embodiment, an election refers to, for example, a query, survey, poll, issues, or public opinion study in a broad population, a business environment, an administrative environment, among a certain demographic, among a private group, and so forth. An election may be published to all accounts associated with the voting platform and it may be published to select accounts.

As used herein, the term "vote" is defined broadly to encompass a vote for a person, thing, issue, or entity, an assent or dissent, a long-form free response, a short-form free response, and so forth. A vote may include selecting one or more responses of a plurality of available responses, or it may include drafting a response that is not provided. A vote may include submitting an opinion response, such as an essay, a factual report, a news report, and so forth. A vote may include selecting a "yes" or "no" response to a query.

In many organizations, including government organizations, business organizations, and administrative organizations, it is common for politicians, officers or decision makers to wish to poll the persons affected by decisions or actions taken by the officers, or to engage with those persons and receive input from them. Further, many persons affected by decisions would benefit from: active engagement with politicians, officers, and decision makers; transparency in the organization; readily accessible information about issues, politicians, officers and decision makers; and the ability to vote on an issue where the outcome is based on the vote. Accordingly, a secure platform for facilitating engagement between politicians, officers and decision makers and constituents is desirable. In addition, a platform that could enable public and verifiable voting on an issue through convenient resources is desirable.

In government organizations, an elected office holder may benefit from receiving updated voting data, suggestions, and issue information from the office holder's constituents. Further, constituents may benefit from a secure and verifiable platform that may enable the constituent to, for example, view the office holder's background information, donation history, and voting record, and engage with the office holder through direct messaging, voting in polls or official elections, and proposing ideas to the politician. Government organizations and constituents may benefit from a platform that enables constituents to govern through, for example, direct elections such as ballot initiatives and elections for office holders. Government organizations and constituents may further benefit from a platform that enables constituents to govern by, for example, directly communicating with office holders and responding to polls regarding how an office holder should proceed with an issue or what issue an office holder should pursue. Further, in a government organization where an office holder may be contractually bound to govern in a legally binding manner according to the constituents' opinion, the government organization may benefit from a platform that may enable constituents to directly vote on an issue and thereby oblige the office holder to govern according to the constituents' opinion.

Further, in various organizations, including government and business organizations, voting in an election or on an issue can be costly, time-consuming, inconvenient, and difficult to verify or authenticate. Constituents, whether of government office holders or candidates or other business ventures, may be frustrated by a lack of transparency in operations (government or business) or an inability to easily communicate with an office holder, candidate, officer or other decision maker. Voters may be frustrated by a lack of easily accessible and verifiable information that may enable a voter to be informed about an issue, a candidate, an office holder, or a donor of a political party or office holder. Therefore, a platform for enabling quick and secure interaction between constituents or voters and candidates, office holders, and donors is desirable.

In an embodiment, a platform accessible through computer, mobile device, telephone Interactive Voice Response (IVR) system, or any other suitable system is designed. The platform may publish information about issues or persons relevant to the organization. The platform may engage decision makers and constituents through, for example, publishing information about decision makers or constituent demographics, publishing background information about decision makers or constituents, and enabling easy and secure direct contact between office holders, candidates, and constituents or voters. In an implementation, the platform may permit a plurality of voters to vote on an issue, a candidate, or an office holder. In an implementation, a plurality of votes is stored in a publicly accessible blockchain network database, wherein the authenticity of the vote may be verified and the database is permanent and unchangeable. In an implementation, a voter may verify that a vote has been properly cast and counted. In an implementation, a result of an election or vote may be published to a plurality of persons or organizations. In an implementation, an office holder may conveniently implement the desires of the office holder's constituents by calling for a vote by the constituents, receiving a report on the result of the vote, and then engaging in a course of action that furthers the interests of the constituents. In an implementation, a government office holder may be contractually bound to govern in a legally binding manner according to the constituents' opinion, and constituents may utilize a platform to directly govern by, for example, voting on a particular issue or voting on what issue should be a top priority. In an implementation, a plurality of persons may utilize a platform to govern by, for example, engaging with politicians, voting on issues, voting on what issues should be a top priority, and submitting suggestions or law amendments.

In an embodiment, a method for crowdsourcing an outcome to an issue is provided. The method includes providing a voting platform from a voting server, wherein the voting server comprises processors and memory. The method includes providing an account facilitated by the voting server to a user. The method includes publishing an election and one or more potential responses to the election to the account. The method includes receiving voting data comprising a vote for the election from the user associated with the account. The method includes generating a record for storing the voting data. The record includes: a hashed identifier assigned to the user of the account, a public key assigned to the user of the account, and the voting data. The method includes broadcasting the record to a distributed network. The method includes storing the record on a blockchain database.

In an embodiment, a method for crowdsourcing an outcome to an issue is provided. The method includes assigning a hashed identifier to a user associated with an account facilitated by a voting server. The method includes assigning a private signing key and a public key to the user. The method includes receiving voting data from the user comprising a vote for an election. The method includes using the private signing key to digitally sign the voting data to produce signed voting data. The method includes publishing the signed voting data with the public key and the hashed identifier to a distributed network. The method includes storing the signed voting data with the public key on a blockchain database.

In an embodiment, a system includes a voting server comprising a voting platform and further comprising processors and memory for executing computing instructions. The system includes an account associated with a user and facilitated by the voting server. The voting platform generates an election comprising one or more of: a candidate to be voted on, an issue to be voted on, and on or more potential responses. The system includes a plurality of nodes comprising processors and memory connected in a distributed network to form a blockchain database. The plurality of nodes is in electronic communication with the voting server. The voting server publishes the election to the account and receives voting data from the user indicating a vote for the election. The voting server broadcasts the voting data to the plurality of nodes to be stored on the blockchain database.

In an embodiment, all data is stored in a blockchain. Each vote or transaction is stored as a record. The record is created with a hash code constructed from all of the data contained within the record including the has code of a prior record. Each record comprises an actor and a target. The actor is the person or entity performing an action and the target is the person or entity being acted upon.

In an embodiment, a user may register with a voting platform facilitated by a voting server. The user will be assigned a unique one-way hashed identifier. The hashed identifier is generated by creating a hash from the user's social security number, the user's birthdate, the user's password, the user's voter identification number, and internal and external data points. The hashed identifier is used to identify the voter, track each vote that the user casts in any election in the platform, and further track any petitions or elections created by the user. The user will further have a private signing key and a public key created that is assigned to that particular user. The public key is published with the user's hashed identifier when the user's record is created. The public key may be used to verify any vote or action taken by the user.

Referring now to the figures, FIG. 1 is a schematic drawing of a system 100zz for crowdsourcing an outcome to an issue, according to one embodiment. The system 100 includes a network 120, such as a cloud-computing network, and/or the Internet, and/or part of a closed or private network. The system 100 includes a database 110 connected to the network 120 that is configured to store data useful to the operation of the system 100. The system 100 includes a voting server 112 for providing a web-based user interface on a display such as a computer 122, a mobile device 124 or any other computing device. The system 100 includes an issue outcome generator 114 that may use data from a plurality of sources or databases for determining an outcome to an issue, wherein the outcome can be determined at least in part by a set of specialized parameters. The system includes a notification component 116 that may determine a notification and publish the notification to a plurality of users.

The database 110 may include any data useful to the operation of the system 100. The data may include, for example, data pertaining to any of candidates, office holders, voters, donors, or issues. The data may include issue position data, issue proposal data, personal data, registration data, progress report data, voter engagement data, pre-vote data, vote data, polling data, and donation data.

The voting server 112 may be connected to the network 120 and the database 110. The voting server 112 may provide a web-based user interface for use on, for example, a computer 122 or a mobile device 124. In an implementation, the voting server 112 provides a user interface to display data pertaining to candidates, such as candidates for public office or candidates for a company position or other organization position. In an implementation, the voting server 112 provides a user interface to display data pertaining to office holders, such as holders of public office or holders of any position in an organization. In an implementation, the voting server 112 provides a user interface for registering a voter, prompting a voter to cast a vote, or displaying any information relevant to a voter.

The issue outcome generator 114 is configured to determine an outcome to an issue, such as an election, based on data from a plurality of sources. Data used by the issue outcome generator 114 may include, for example, issue category data, issue position data, suggestion data, pre-voting data, voting data, voter demographic data, and any additional data useful to determining an outcome of an issue. In an implementation, the issue outcome generator 114 determines an outcome of an election based on a plurality of votes received over the network 120. In an implementation, the issue outcome generator 114 determines whether a holder of public office or other decision maker should vote in favor or against an issue based on a plurality of votes received over the network 120. In an implementation, the issue outcome generator 114 determines a demographic that is most likely to vote in a particular way in an election. In an implementation, the issue outcome generator 114 enables government constituents to govern by indicating, for example, how an elected politician should vote on a particular issue or enabling constituents to vote directly on an issue such as a ballot initiative. In an implementation, the issue outcome generator 114 enables constituents (government or business) to govern by determining amendments that should be proposed to current rules or laws based on constituent input, and further determining the best amendment based on constituent votes and input.

The notification component 116 determines a notification to publish to a particular user or group of users. The notification component 116 may automatically generate and publish an outcome of a vote to a group of, for example, voters, candidates, office holders, decision makers, or donors. The notification may include, for example, a result of a vote, a pre-vote, or a poll. In an implementation, the notification includes an indication that a voter has engaged with a candidate or an office holder, or that an office holder or candidate has engaged with a voter. In an implementation, the notification includes an indication that an office holder has, for example, not attended a meeting, has voted on an issue, or has accepted a donation. In an implementation, an office holder may be contractually obligated to govern in a legally binding manner according to constituent opinion and the notification component 116 may publish a notification indicating how the office holder should proceed based on constituent opinion. In an implementation, the notification component 116 may automatically change, for example, rules and regulations for a business, administration, or other organization based on the outcome of a vote.

In an embodiment, the voting server 112 facilitates a voting platform and the voting server 112 comprises processors and memory. The voting server may facilitate an account to be created by a user, and the voting server may further authenticate the account to ensure the user is the correct person according to public and/or private records. The voting server 112 may publish an election and one or more potential responses to the election to the account and receiving voting data from the account. The voting server 112 may generate a record for storing the voting data, and the record may comprise: a hashed identifier assigned to the user of the account, a public key assigned to the user of the account, and the voting data.

Figure 2:
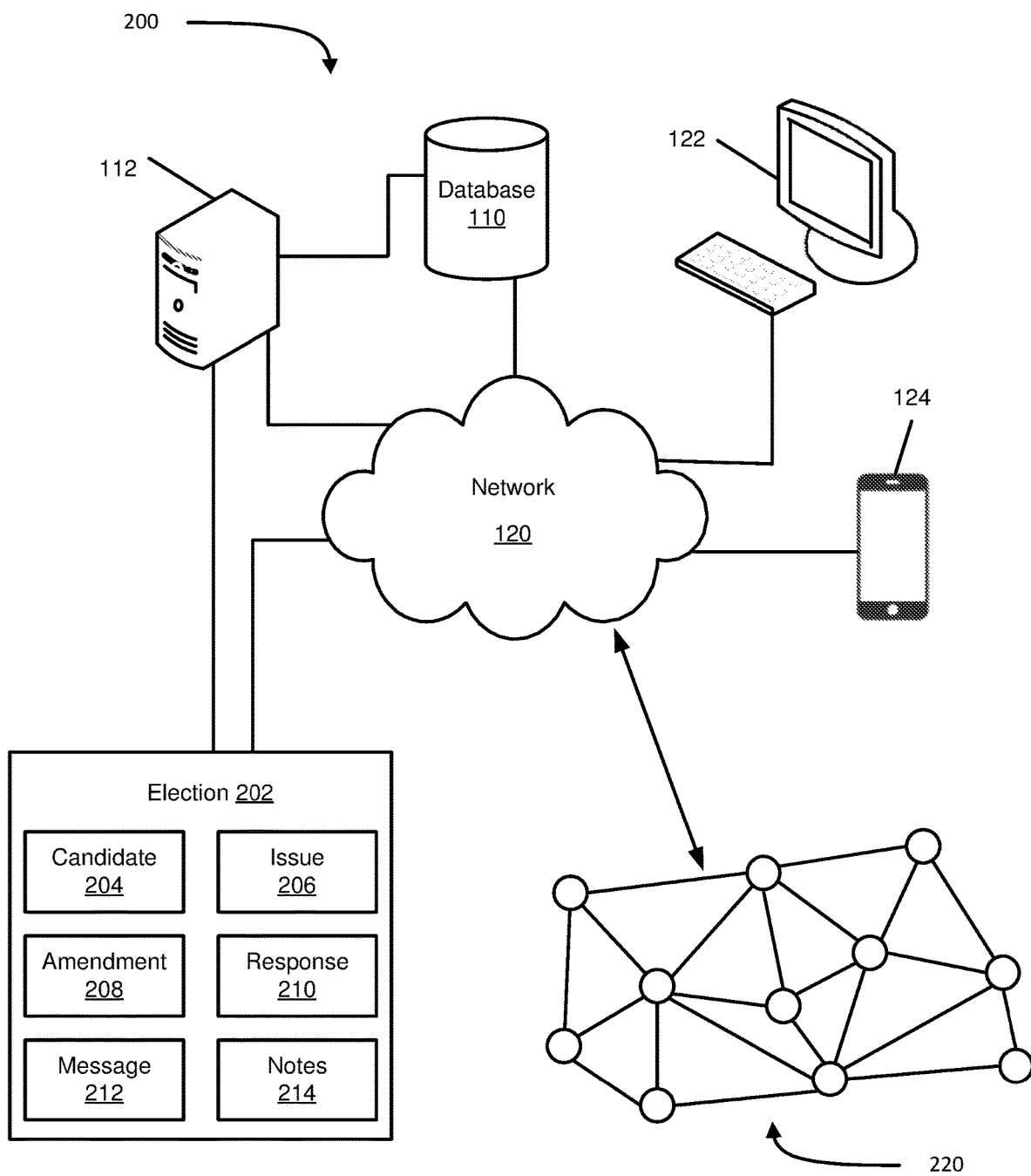
FIG. 2 illustrates a schematic diagram of a voting system made in accordance with the teachings and principles of the disclosure.

FIG. 2 is a schematic drawing of a system 200 for crowdsourcing an outcome to an issue, according to one embodiment. The system 200 includes a network 120, such as a cloud-computing network, and/or the Internet, and/or part of a closed or private network. The system 200 includes a database 110 connected to the network 120 that is configured to store data useful to the operation of the system 200. The system 200 includes a voting server 112 for providing a web-based user interface on a display such as a computer 122, a mobile device 124, or any other computing device. The system 200 includes an election 202 determined by the voting server 112 including one or more of: a candidate 204, an issue 206, an amendment 208, a response 210, a message 212, and notes 214. The system 200 includes a plurality of nodes in a distributed network to form a blockchain database 220.

In an embodiment, the voting server 112 includes a voting platform that may be displayed on a computer 122 or mobile device 124. The voting server 112 may provide the voting platform to a user associated with an account, and the account may access the voting server 112 via a user interface accessible on, for example, a computer 122 or a mobile device 124. The voting server 112 may provide the account to a user. The voting server 112 may publish the election 202 to an account. The voting server 112 may receive voting data comprising a vote for the election 202 from a user associated with the account. The voting server 112 may generate a record for storing the voting data. The voting server 112 may broadcast the record to a distributed network of node forming a blockchain database 220.

In an embodiment, the election 202 is published to a plurality of accounts facilitated by the voting server 112. The accounts may access the voting server 112 via, for example, a computer 122 or mobile device 124 connected to the network 120. In an embodiment, the election 202 includes a candidate 204. The candidate includes, for example, a person running for a government office, a person running for an administrative office, a person seeking a position in a business or corporation, and so forth. The election 202 may include an issue 206. The issue includes, for example, a bill to be voted on by a legislative body, a controversial topic, a decision to be made by a governmental body, and administrative body, or a business or corporate body, or a topic that a user has indicated should be voted on. The election 202 may include an amendment 208. That amendment includes, for example, an amendment to be made to an existing law or to a bill to be voted on by a legislative body, an amendment to be made to an existing regulation, rule, or professional guideline, an amendment to an existing election query, and so forth. The election 202 may include a response 210. The response includes, for example, a plurality of candidates to select from for a particular office, an indication that a user is in favor of or in opposition to an issue or amendment, a free response to a query, and so forth.

In an embodiment, the election 202 includes a message 212. The message includes, for example, a background summary on a candidate, an issue, an amendment, or a response, and so forth. The message may include a public policy brief. The message may include an opinion paper, a fact-based paper, or any other written document concerning a candidate, an issue, or an amendment, and so forth. The message may include an advertisement. The message may include a list of reasons to vote in favor of or to vote in opposition to an issue. The message may include a voting history of a candidate. The message may include a schedule of a person or candidate, such as a public daily itinerary schedule of the person, candidate, or public office holder.

In an embodiment, the election 202 includes notes 214. In an embodiment, the notes 214 include messages, drawings, or images collected by the user associated with the account. In an embodiment, the notes 214 include messages, drawings, or images collected by a plurality of users associated with a plurality of accounts, or by a different user associated with a different account that may be connected to the user that is viewing the election 202. In an embodiment, the notes 214 are a reminder to the user of the account that the user has previously made a decision on the election 202 topic. In an embodiment, the voting server 112 provides, for example, a public office to be voted on including a plurality of candidates to select from to an account. The voting server 112 may further provide in the election 202 a note 214 previously prepared by the user indicating that the user had decided to vote for a particular candidate. Such an implementation may be desirable where an election 202 includes a plurality of issues or persons to be voted on, or where an election 202 includes particularly complicated issues or amendments. A user of an account may wish to prepare notes prior to voting in the election 202 and the user may wish to view those notes while voting in the election 202.

In an embodiment, the plurality of nodes connected in a distributed network to form a blockchain database 220 is in communication with the voting server 112 via a network 120. The plurality of nodes may receive records prepared by the voting server 112 indicating new voting data to be stored on the blockchain database. The blockchain database may verify the authenticity of votes received by the voting server 112.

In an embodiment, the voting server 112 generates a record to be stored on the blockchain database 220. The record includes a hashed identifier assigned to the user. The hashed identifier is generated based on one or more of: a social security number of the user, a birthdate of the user, a password created by or provided to the user, and a voter identification number of the user. The record further includes a public key assigned to the user of the account. In an embodiment, the user or a third party may look up a vote based on the public key and verify that the vote is stored correctly. The record further includes the voting data.

In an embodiment, the record further comprises a prior record hashed identifier from a prior record stored in the blockchain database. The prior record hashed identifier may include some or all the data stored in the prior record. The nodes of the blockchain database 220 may rely on the prior record hashed identifier to verify that the new record is legitimate and should be stored on the blockchain database 220. If the prior record hashed identifier does not match the prior record stored on the blockchain database 220, then the new record will be rejected and it will not be stored on the blockchain database 220.

In an embodiment, the record further comprises an actor identifier indicating an entity performing an action. The actor identifier may indicate the user is performing the action. The action may include, for example, submitting an election request, submitting a vote, submitting a message, revising a vote, registering a new user, and so forth. The record may further include a target identifier indicating an entity receiving the action. In an embodiment, the target identifier indicates a hash code identifier of an original item such as a prior record. The record further includes an action code that may be a numerical code indicating an action occurring in the new record.

The record may further include a stamp indicating a date and time the action was received. The action may include receiving voting data, receiving a new user registration, receiving a revision to a previously-cast vote, receiving message data, receiving other data, and so forth. The record may further include an indication of a data format for the record.

Figure 3:
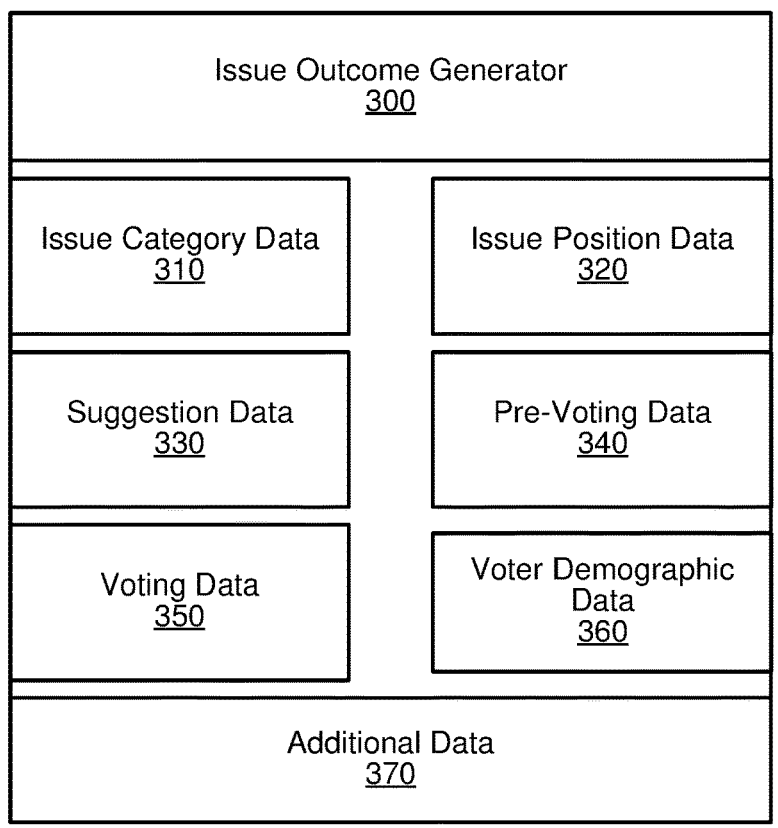
FIG. 3 illustrates a schematic block diagram of an issue outcome generator in accordance with the teachings and principles of the disclosure.

FIG. 3 is a schematic block diagram of an issue outcome generator 300 according to one embodiment. In an embodiment, the issue outcome generator 300 is integrated in the voting server 112. Alternatively, the issue outcome generator 300 may be referred to as the voting server 112. The issue outcome generator 300 includes issue category data 310, issue position data 320, suggestion data 330, pre-voting data 340, voting data 350, voter demographic data 360, and any additional data 370 useful to the application.

Issue category data 310 may include any data concerning a particular type of issue. The issue category data 310 may indicate that an election concerns, for example, determining a person to fill a position for public office, determining whether an office holder should vote in favor or against a particular piece of legislation, whether an office holder should pursue a particular issue, or any other subject that may be voted on.

Issue position data 320 may include any data concerning a perspective or point-of-view on a particular issue by a candidate, office holder, voter, or donor. The position data 320 may indicate, for example, that an office holder believes that a piece of legislation is beneficial to a community, and the position data 320 may indicate why the office holder believes the legislation is beneficial. The issue position data 320 may be published for voters to view before voting. In an implementation, the issue position data 320 is used to determine a final outcome of an issue by the issue outcome generator 300. In such an implementation, the issue position data 320, for example provides an indication that an office holder believes pending legislation is beneficial, may be used alongside constituent votes to determine whether the office holder should vote in favor of the legislation or other outcome. In an implementation, the issue position data 320 may indicate that an office holder has agreed to vote for or against an issue based on a threshold number of votes or percentage of votes from the office holder's constituents.

Suggestion data 330 may include, for example, a suggestion that an office holder or candidate should pursue a particular issue, should propose a particular legislation or administrative rule, or should propose an amendment or alternative to pending legislation. The suggestion data 330 may be received from any of an office holder, a candidate, a voter, or a donor. In an implementation, the suggestion data 330 may be used by the issue outcome generator 300 to determine a final outcome of an issue. In such an implementation, the issue outcome generator 300 may be programmed to apply a certain weight to, for example, a suggestion by a donor or voter that an office holder should submit an amendment on pending legislation or other outcome.

Pre-voting data 340 may include, for example, pre-votes from office holders, candidates, voters, or donors on a particular issue. A pre-vote may include a voting period occurring before an official and binding election or a voting period before a final vote. A pre-vote may include a poll or a vote on a preliminary portion of a larger issue. Pre-voting data 340 may include a plurality of votes and the votes may be attached to demographic information about the voter. The issue outcome generator 300 may use pre-voting data 340 to indicate, for example, that a particular demographic of voters have indicated that a candidate should abandon a particular issue or vote in favor of a particular issue.

Voting data 350 may include, for example, votes from office holder, candidates, voters, or donors on a particular issue. Voting data 350 may be collected in, for example, an official and binding election or a final vote on a particular issue. Voting data 350 may include a plurality of votes and the votes may be attached to demographic information about the voter. In an implementation, a voter may change a vote a plurality of times until a deadline indicating that the election has closed. In an implementation, the issue outcome generator 300 may determine, for example, a winner of an election based solely on voting data 350. In an implementation, the issue outcome generator 300 may determine, for example, that an office holder should vote in favor of a particular issue based on voting data 350 from the office holder's constituents, suggestion data 330 from the office holder's constituents, and issue position data 320 from the office holder's constituents.

Voter demographic data 360 may include any data about a voter. Voter demographic data 360 may include, for example, a name, gender, race, national origin, socioeconomic status, religion, party affiliation, past voting history, employment status, education status, or location of a voter, or any other relevant information about a voter. In an implementation, the voter demographic data 360 is private and cannot be accessed without special authorization. In an implementation, at least some of the voter demographic data 360 is public. In an implementation, voters must agree to publish or deny the authority to publish any part of the voter demographic data 360 when the voter registers or before the voter casts a vote. In an implementation, voter demographic data 360 may indicate a percentage of an office holder's constituents who have registered for the platform and/or voiced an opinion on a particular issue. In an implementation, voter demographic data 360 may indicate whether a threshold number/percentage of constituents have voiced an opinion on a particular issue.

Additional data 370 may include any data relevant to determining an outcome to an issue, determining an authenticity of an election or vote, determining a demographic of voters, or determining any other conclusion relevant to the application.

Figure 4:
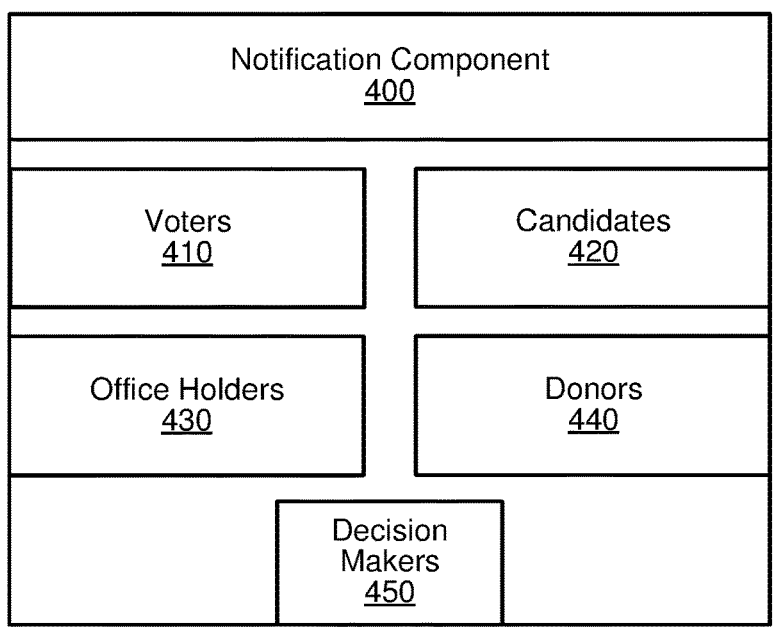
FIG. 4 illustrates a schematic block diagram of a notification component in accordance with the teachings and principles of the disclosure.

FIG. 4 is a schematic block diagram of a notification component 400 according to one embodiment. In an embodiment, the notification component 400 is integrated in the voting server 112. Alternatively, the notification component 400 may be referred to as the voting server. The notification component 400 may publish a notification to, for example, voter 410, candidates 420, office holder, 430, donors 440, and/or decision makers 450. The notification component 400 may be configured to determine a notification, such as an indication that a candidate has won or lost an election or that an issue was decided in a certain manner, and automatically generate and publish that notification to a particular person or group of persons. The notification component 400 may publish, for example, an indication of an outcome of a vote or election, an indication that a vote or election will take place on a certain date, and indication that a voter is invited to vote, and indication that an office holder has or has not followed guidance by the office holder's constituents, or an indication that a vote has successfully been cast or has not been properly received. The notification component 400 may be configured to determine any notification relevant to the application and may automatically generate and publish a notification to any plurality of persons. In an implementation, the notification component 400 is configured to automatically generate and publish a notification to a plurality of voters 410, but only to voters of a particular demographic group. In an implementation, the notification component 400 is configured to publish a notification to an office holder 430 indicating that the office holder's constituents have voted in favor of a particular issue.

In an implementation, the notification component 400 may determine and publish a report including voter demographic information on an issue. The report may indicate how a plurality of voters from a particular demographic voted on a particular issue. The report may indicate the dominant demographic that voted in favor of or against an issue. The report may indicate how voters chose to vote e.g., by computer, tablet, mobile device, or telephone IVR, and demographic information of the voters based on how they voted. The report may indicate a percentage of voters who voted early or voted on the final election day. The report may indicate a percentage of voters who also donated to a candidate, office holder, nonprofit, or other organization. The report may indicate any information received by the system 100 and relevant to a receiving party.

In an implementation, the notification component 400 may permit constituents to govern an organization, such as a business, administrative agency, government organization, or other organization. In an implementation, the notification component 400 may automatically revise, for example, the rules and regulations of the organization based on the outcome of a vote. In an implementation, the notification component 400 may indicate to a politician or other decision maker that the constituents have voted for or against a particular issue. In an implementation, a decision maker may be obligated to govern according to constituent opinion, and the notification component 400 may notify the decision maker that, for example, the constituents have voted in a particular manner on a pending issue or have submitted an amendment that the decision maker should consider.

Figure 5:
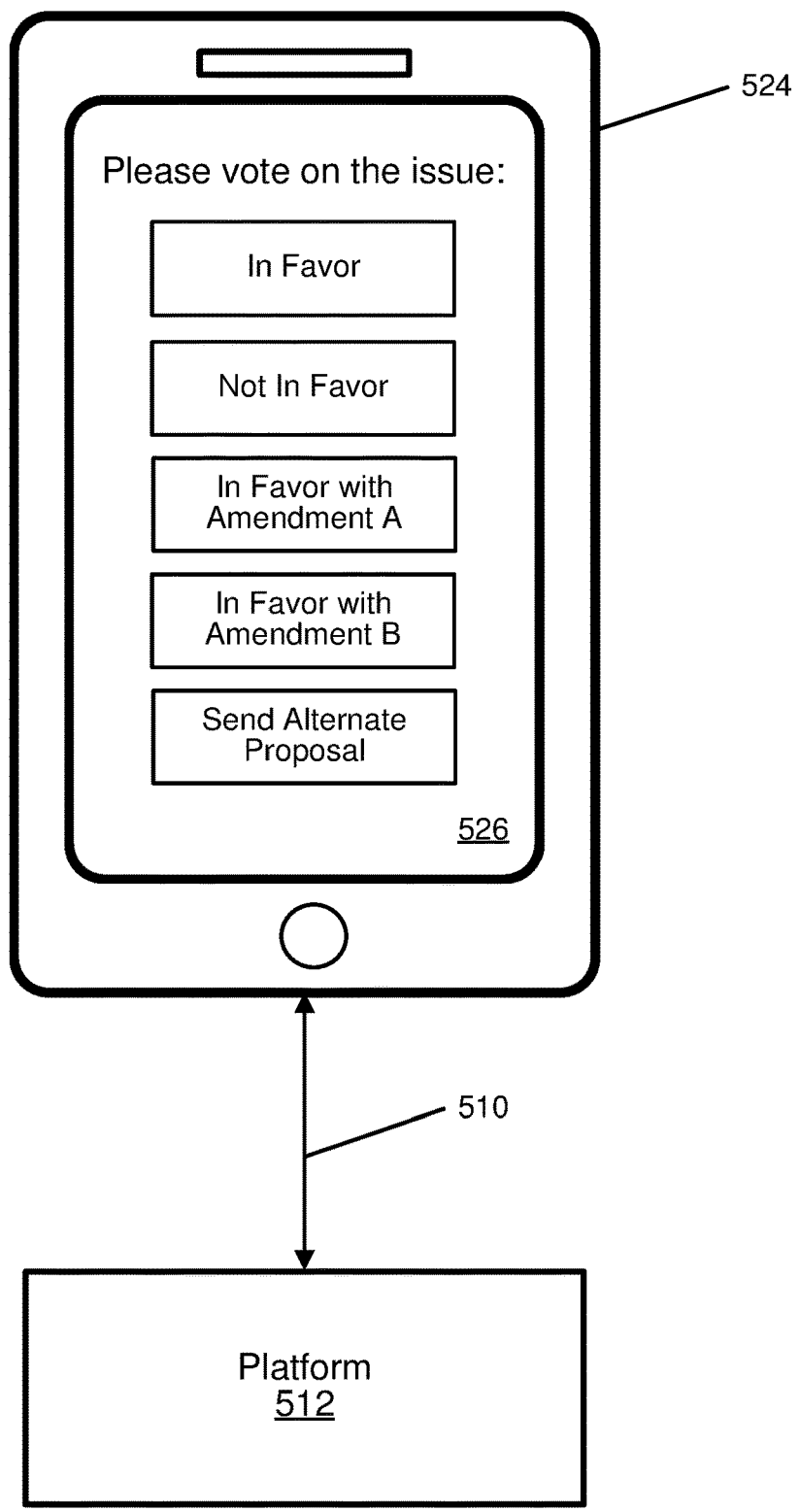
FIG. 5 illustrates a schematic diagram of a mobile device in communication with a decision determination platform in accordance with the teachings and principles of the disclosure.

FIG. 5 is a schematic diagram of a mobile device 524 communicating with a voting platform 512. The mobile device 524 may communicate 510 with the platform 512 in any suitable communication method. In an implementation, the mobile device 524 communicates 510 with the platform 512 over a network connection, such as a wired, wireless or other network connection using any wired or wireless standard. In an implementation, the communication 510 is encrypted. In an implementation, the communication 510 is public and stored in a blockchain database system. In an implementation, the mobile device 524 includes a user interface 526 that may enable a user to conveniently interact with the platform 512. As pictured in FIG. 5, the user interface 526 may prompt a user to vote on a particular issue and provide the user with varying options for the vote.

It should be appreciated that a user may communicate with the platform 512 in any number of ways and need not communicate with the platform 512 with a mobile device 524. A user may communicate with the platform 512 with, for example, a desktop computer, a laptop, a telephone IVR system, or any other suitable method now known in the art or later developed.

Figure 6:
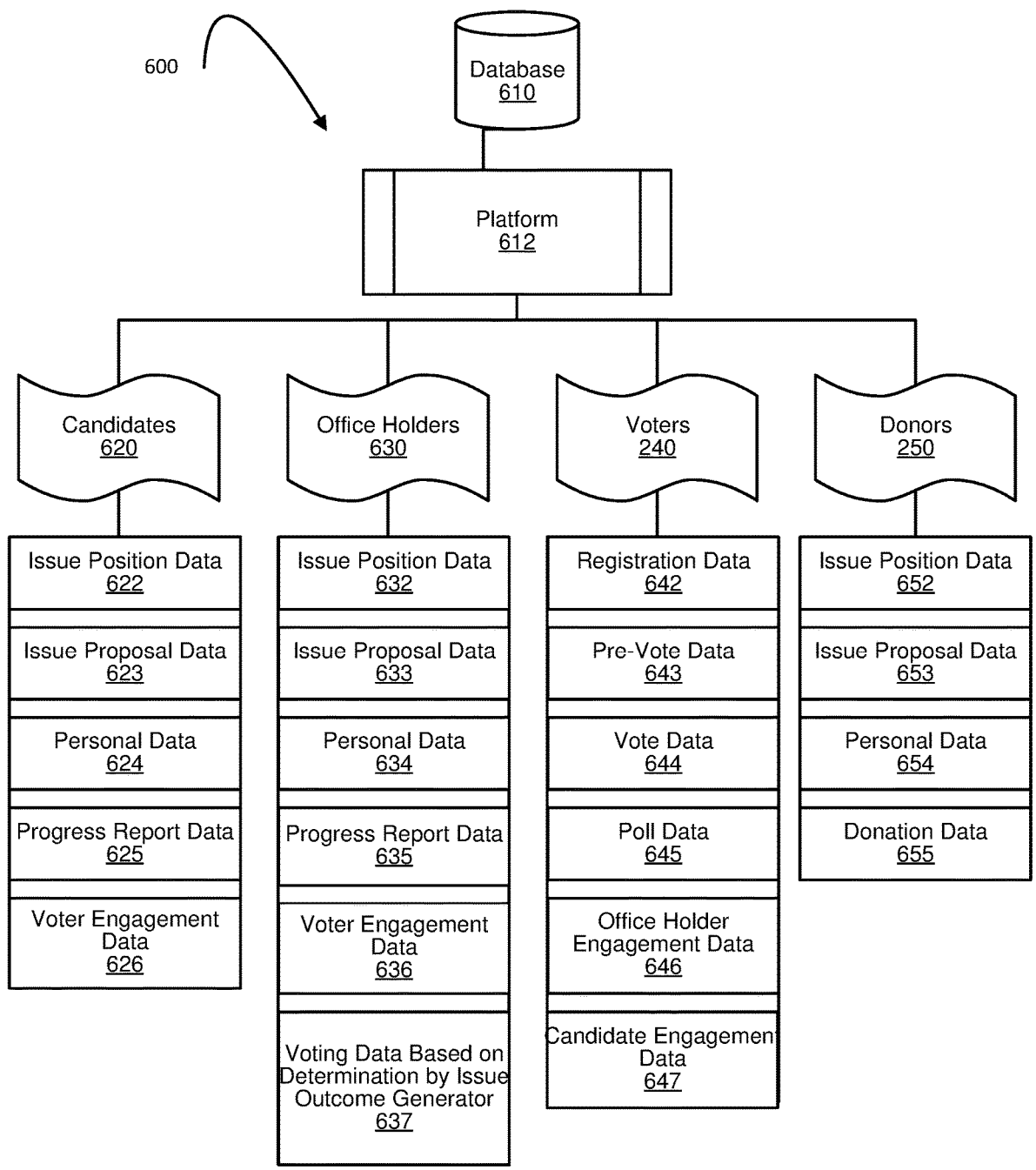
FIG. 6 illustrates a schematic block diagram of a voting platform made in accordance with the teachings and principles of the disclosure.

In FIG. 6, a schematic block diagram of a voting system 600 is illustrated. The voting system 600 includes a database 610 and a platform 612. The platform 612 may include a user interface that may be displayed on, for example, a computer or a mobile device, and it may include a telephone-based Interactive Voice Response (IVR) system. The platform 612 may be in communication with, for example, candidates 620, office holders 630, voters 640, and donors 650. It will be appreciated that the platform may be in communication with others, such as corporate officers, shareholders, employees, or the like without departing from the scope of the disclosure.

In an implementation, candidates 620 may interact with the platform 612 over a network 130 such as a cloud-computing network, the Internet, or a closed network. Candidates 620 may include, for example, candidates for public office or candidates for a position in a business or organization. Data pertaining to candidates 620 may include, for example, issue position data 622, issue proposal data 623, personal data, 634, progress report data 625, and voter engagement data 626. Issue position data 622 may include a candidate's perspective or point-of-view on a particular issue, or a candidate's summary in favor or against a particular issue. Issue proposal data 623 may include, for example, a candidate's proposal to pursue a course-of-action, to promote a particular issue, or to vote for or against a particular issue. Personal data 624 may include, for example, the candidate's background information, resume, experience, schedule, or accepted donations. Progress report data 625 may include, for example, data about a candidate's progress in an election, progress in pursuing a particular issue, or progress in raising donations. Voter engagement data 626 may include, for example, a communication from a candidate 620 to a voter 640 or an announcement from a candidate 620.

Data concerning office holders 630 may include, for example, issue position data 632, issue proposal data 633, personal data 634, progress report data 635, voter engagement data 636, or voting data based on a determination by issue outcome generator 637. Issue position data 632 may include, for example, the office holder's perspective or point-of-view on a particular issue, the office holder's intent to vote for or against a particular issue, or an office holder's explanation of a particular issue. Issue proposal data 633 may include, for example, an office holder's intent to propose a particular issue, engage with voters on a particular issue, or submit an agenda concerning a particular issue. Personal data 634 may include, for example, the office holder's background information, resume data, schedule, communications with other persons, experience, accepted donations, or any other information that may be relevant to a voter or the office holder may wish to publish. Progress report data 635 may include, for example, data about an office holder's progress in pursuing a particular agenda, raising donations, or gathering votes for a particular issue. Voter engagement data 636 may include any communication between an office holder 630 and a voter 640. Voting data based on a determination by the issue outcome generator 637 may include any data determined by the issue outcome generator (e.g., 114 in FIG. 1) and may include, for example, the results of a vote, a pre-vote, a poll, or a voter demographic.

Data concerning voters 640 may include, for example, registration data 642, pre-vote data 643, vote data 644, poll data 645, office holder engagement data 646, or candidate engagement data 647. Registration data 642 may include, for example, data pertaining to registering a voter to vote, data pertaining to the voter's identity, data for verifying the voter's identity, or authentication that the voter has only one voting account. Pre-vote data 643 may include, for example, votes cast by a voter in a pre-vote election or an election before an official and binding election. Vote data 644 may include, for example, votes cast by a voter 640 in an official and binding election. Poll data 645 may include, for example, votes cast by a voter 640 in a poll such as a public opinion poll or a poll within an organization to determine, for example, how voters plan to vote in an official and binding election or how voters believe an office holder or candidate should handle an issue. Office holder engagement data 646 may include, for example, any communication between a voter 640 and an office holder 630. Candidate engagement data 647 may include, for example, any communication between a voter 640 and a candidate 620.

Data concerning donors 650 may include, for example, issue position data 652, issue proposal data 653, personal data 654, or donation data 655. Issue position data 652 may include, for example, a donor's position on a particular issue, a donor's perspective or point-of-view on a particular issue, a donor's explanation of a particular issue, or a donor's argument in favor or against a particular issue. Issue proposal data 653 may include, for example, a donor's proposal that an office holder 630 or candidate 620 should pursue a particular issue, a donor's proposal for a particular law or administrative rule, or a donor's proposal that an office holder 630 or candidate 620 should vote in a particular manner on a particular issue. Personal data 654 may include, for example, data concerning a donor's identity, tax status, donation history, or any other personal data concerning a donor. Donation data 655 may include, for example, a ledger of donations made by the donor, an amount of donations made by the donor, or a ledger of donations made by the donor to a particular office holder 630 or candidate 620.

Figure 7:
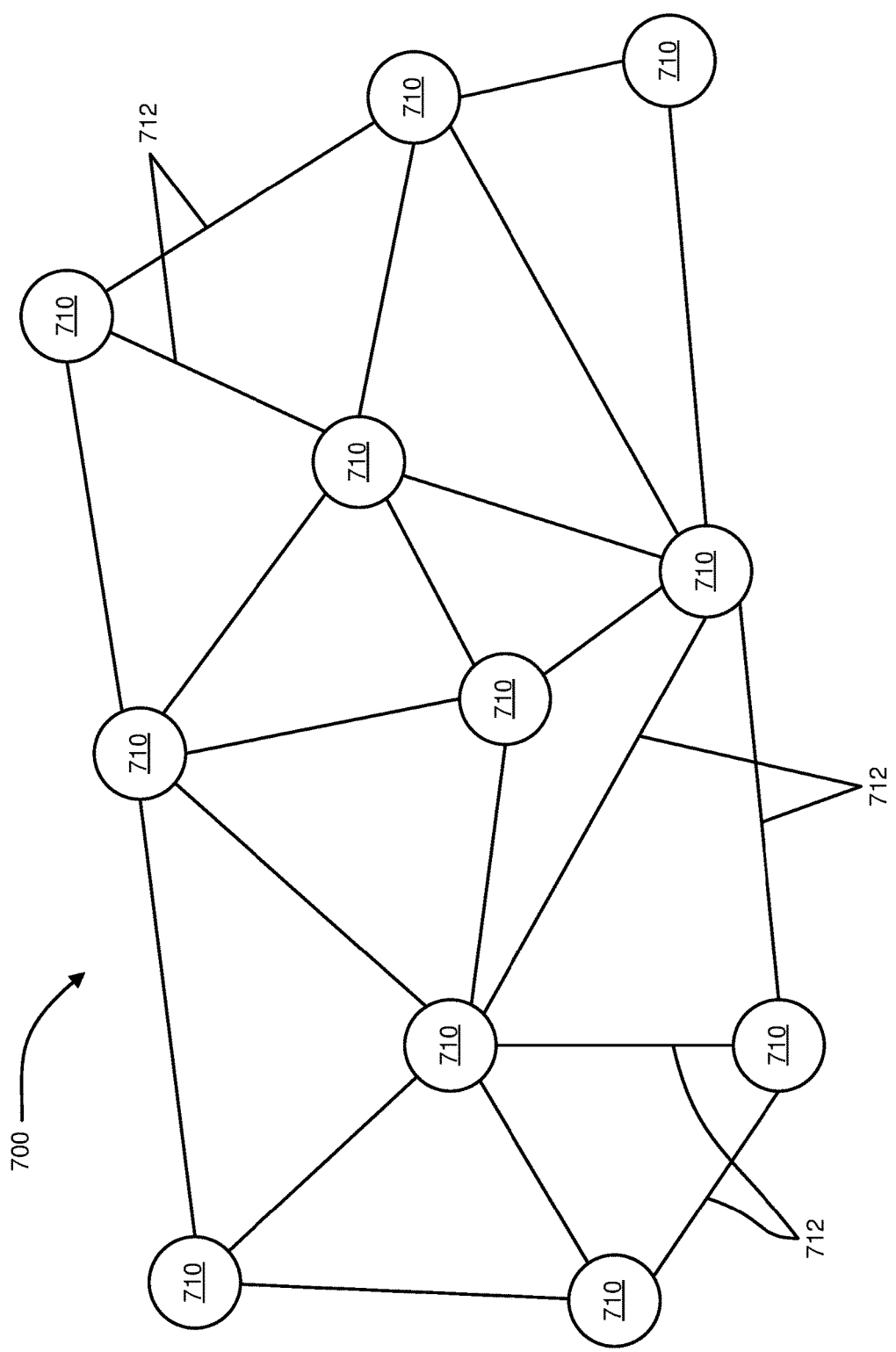
FIG. 7 illustrates a schematic diagram of a blockchain network in accordance with the teachings and principles of the disclosure.

FIG. 7 is a schematic diagram of a blockchain database 700 according to one embodiment. A blockchain database 700 may include a public database that is verified by a plurality of computing resources. The blockchain database 700 includes a plurality of nodes 710, such as a computer, and a plurality of communications 712 between nodes 710. Each of the plurality of nodes 710 may verify the authenticity of the database.

In an embodiment, each of the plurality of nodes 710 comprises processors and memory. The nodes 710 are connected in a distributed network as shown to form a blockchain database.

Figure 8:
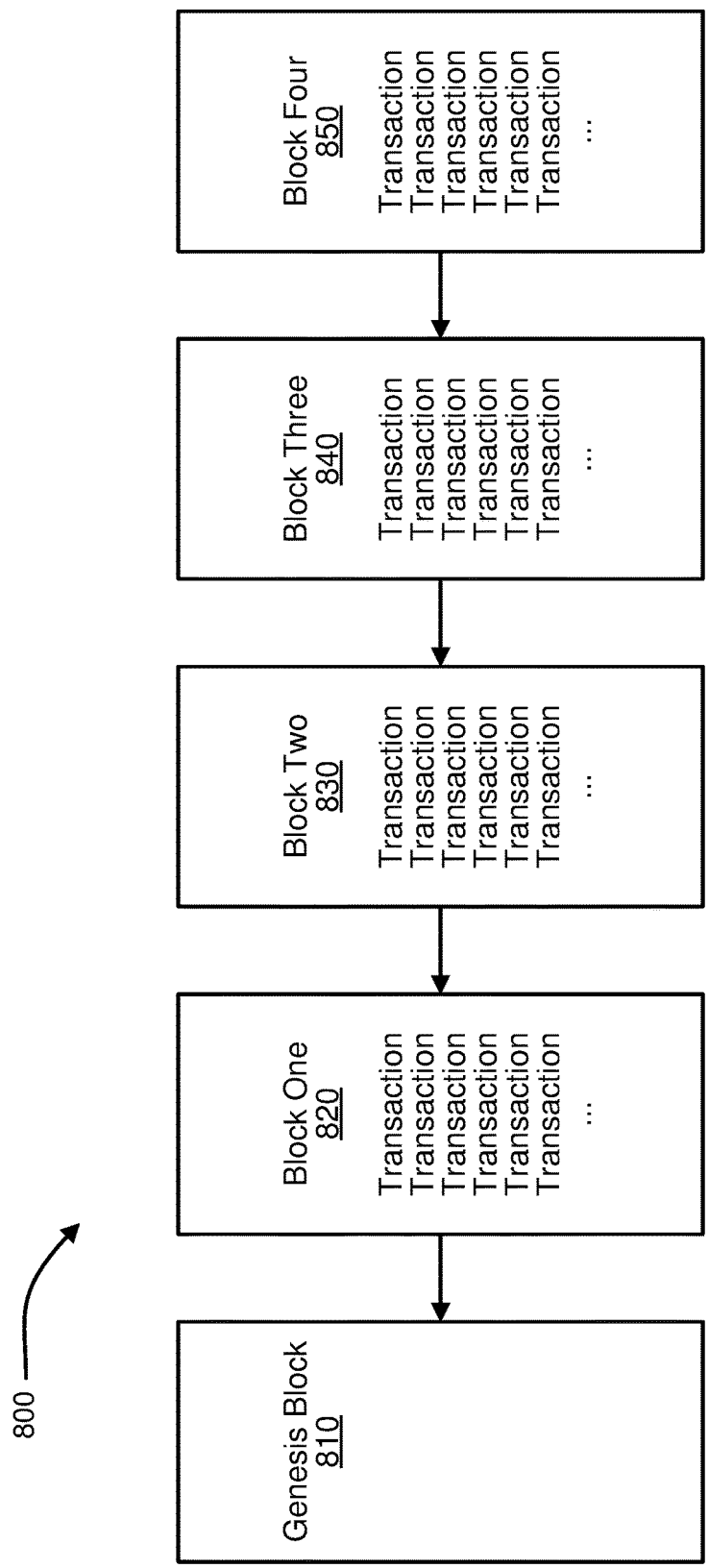
FIG. 8 illustrates a schematic diagram of a blockchain database in accordance with the teachings and principles of the disclosure.

FIG. 8 is a schematic diagram of a blockchain system 800 according to one embodiment. The blockchain system 800 includes a genesis block 810 and a plurality of blocks thereafter 820, 830, 840, 850. The genesis block 810 marks the beginning of the blockchain database. Block one 820 is a block of data that immediately follows the genesis block 810. Block two 830 is a block of data that immediately follows block one 820. Block three 840 is a block of data that immediately follows block two 830. Block four 850 is a block of data that immediately follows block three 840, and so forth. The blockchain database 800 may include a plurality of blocks, such as blocks one 820 through four 850, into perpetuity. Each of the blocks 820-850 may include a plurality of transactions or votes and the authenticity of each block may be signed by the node 710 (see e.g., FIG. 7) that created the block. The authenticity of each block from block one 820 into perpetuity may be authenticated by every node 710 (see e.g., FIG. 7).

In an implementation, the system 100 determines the outcome to an issue or the results of an election or vote through a blockchain database 700, 800. In contrast to a standard database that is tracked by a single computer or group of computers, a blockchain database uses a decentralized system with many computers or nodes 710 managing the database. A blockchain database comprises two components: a peer-to-peer component that communicates new changes to the database and the database itself that stores a complete history of all transactions in the order in which they occurred.

In an implementation, the peer-to-peer component serves to communicate a new vote to the database. The peer-to-peer component includes a plurality of nodes 710 (i.e., computers) and no particular node 710 has the power to censor information from any other node because all nodes can propagate database information. A change to the database, such as a new vote, can be sent to any of the nodes and may be sent to a plurality of nodes. The new change may be quickly propagated throughout the entire network through communications between nodes 712. A blockchain database is highly resistant to censorship because each node receives the entirety of the database and each node can verify the authenticity of the database information.

The database component stores a complete history of all transactions in the order in which they occurred. The database transactions are constructed as a history of transactions or modifications to the database. The database begins with a genesis block 810 that includes simple information and is easily verifiable by every node 710. The transactions are stored in blocks 820-850 after the genesis block 810 and into perpetuity. Transactions accumulate in blocks and when a new block is added to the network it will group transactions together and establish an order in which the transactions occurred. The node that created a block will authenticate the block with a cryptographic signature at the end of the block. The cryptographic signature will establish a link to the previous block. The cryptographic signature in block one 820 will establish a link to the genesis block 810, and in all other blocks the cryptographic signature will establish a link to the block preceding it. If any of the data within a block is changed, the cryptographic signature at the end of the block is no longer valid and every node in the network may see that the block was changed. Further, if any data within any block is changed, the cryptographic signatures at the end of all blocks following the changed block will also be invalid. The blockchain database therefore establishes an unchangeable permanent record for the database. Every new node in the network will replay the history of transactions and come to a conclusion as to the state of the authenticity of the database.

In an implementation, the blockchain database may follow a proof-of-work (PoW) consensus protocol. A PoW consensus protocol is a piece of data that is time-consuming to produce, but easy for others to verify. In an implementation, a PoW can be a random process with a low probability of success so that a lot of trial and error is required before a valid PoW is generated. In an implementation, the blockchain database may use a hashcash PoW. The procedure of PoW may make it more difficult for blocks to be generated and therefore more difficult for an invalid vote to be stored in the database.

In an implementation, each vote is attached to an identifier that may be associated with a particular voter. The identifier may include, for example, a numeric or alphanumeric code that is communicated only to the voter it is associated with. The voter may then personally view the blockchain database and verify that the vote attached to the voter's personal identifier has been received and entered into the database. In an implementation, the voter may see that vote itself and may verify that the vote was cast correctly. In an implementation, the voter may see every vote cast in the database and may personally verify that the results of the election or issue determination are correct and valid.

In an implementation, each of the identifiers may be associated with a voter account that includes information about the voter, such as for example location data, demographic data, past voting history data, party affiliation data, and donation history data. In an implementation, a user may view information about the voter that is associated with any vote identifier. In an implementation, a user may, for example, see that a vote for a particular issue was cast by a person of a particular socioeconomic status, gender, religion, and party affiliation. In an implementation, a user may, for example, see demographic information about all voters that voted on a particular issue and in a particular manner.

Figure 9:
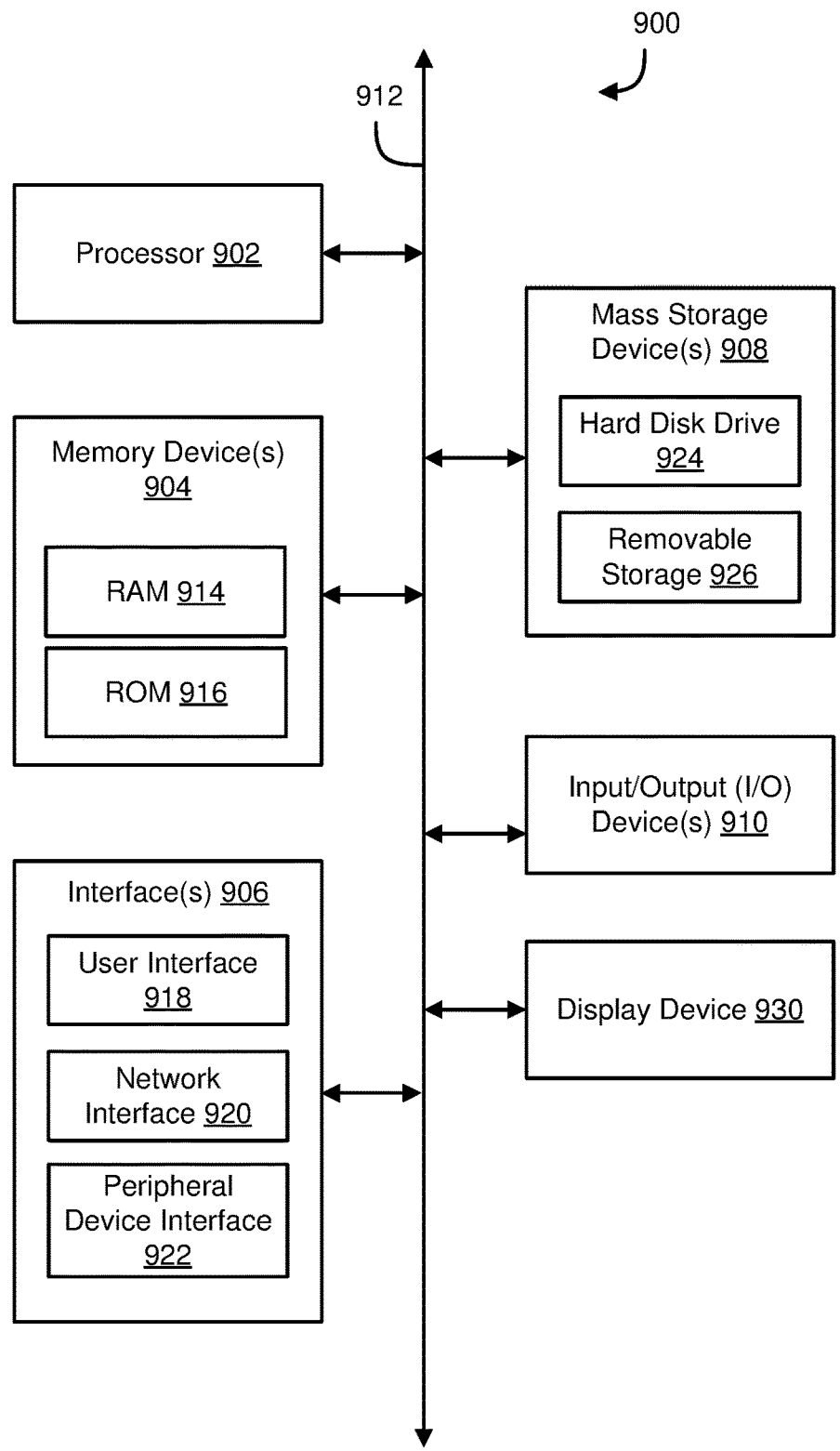
FIG. 9 illustrates a schematic diagram of an example computing device in accordance with the teachings and principles of the disclosure.

FIG. 9 is a schematic block diagram of an example computing device 900. Computing device 900 may be used to perform various procedures, such as those discussed herein. Computing device 900 can function as a server, issue outcome generator 114, or the like. Computing device 900 can perform various functions as discussed herein, such as receiving a request, determining an illumination scheme, processing a reservation, and processing functionality described herein. Computing device 900 can be any of a wide variety of computing devices, such as a desktop computer, vehicle control system, a notebook computer, a server computer, a handheld computer, tablet computer, and the like.

Computing device 900 includes one or more processor(s) 902, one or more memory device(s) 904, one or more interface(s) 906, one or more mass storage device(s) 908, one or more Input/Output (I/O) device(s) 910, and a display device 930 all of which are coupled to a bus 912. Processor(s) 902 include one or more processors or controllers that execute instructions stored in memory device(s) 904 and/or mass storage device(s) 908. Processor(s) 902 may also include various types of computer-readable media, such as cache memory.

Memory device(s) 904 include various computer-readable media, such as volatile memory (e.g., random access memory (RAM) 914) and/or nonvolatile memory (e.g., read-only memory (ROM) 916). Memory device(s) 904 may also include rewritable ROM, such as Flash memory.

Mass storage device(s) 908 include various computer readable media, such as magnetic tapes, magnetic disks, optical disks, solid-state memory (e.g., Flash memory), and so forth. As shown in FIG. 9, a particular mass storage device is a hard disk drive 924. Various drives may also be included in mass storage device(s) 908 to enable reading from and/or writing to the various computer readable media. Mass storage device(s) 908 include removable media 926 and/or non-removable media.

I/O device(s) 910 include various devices that allow data and/or other information to be input to or retrieved from computing device 900. Example I/O device(s) 910 include cursor control devices, keyboards, keypads, microphones, monitors, or other display devices, speakers, printers, network interface cards, modems, and the like.

Display device 930 includes any type of device capable of displaying information to one or more users of computing device 900. Examples of display device 930 include a monitor, display terminal, video projection device, and the like.

Interface(s) 906 include various interfaces that allow computing device 900 to interact with other systems, devices, or computing environments. Example interface(s) 906 may include any number of different network interfaces 920, such as interfaces to local area networks (LANs), wide area networks (WANs), wireless networks, and the Internet. Other interface(s) include user interface 918 and peripheral device interface 922. The interface(s) 906 may also include one or more user interface elements 918. The interface(s) 906 may also include one or more peripheral interfaces such as interfaces for printers, pointing devices (mice, track pad, or any suitable user interface now known to those of ordinary skill in the field, or later discovered), keyboards, and the like.

Bus 912 allows processor(s) 902, memory device(s) 904, interface(s) 906, mass storage device(s) 908, and I/O device(s) 910 to communicate with one another, as well as other devices or computers couples to bus 912. Bus 912 represents one or more of several types of bus structures, such as system bus, PCI bus, IEEE bus, USB bus, and so forth.

Figure 10:
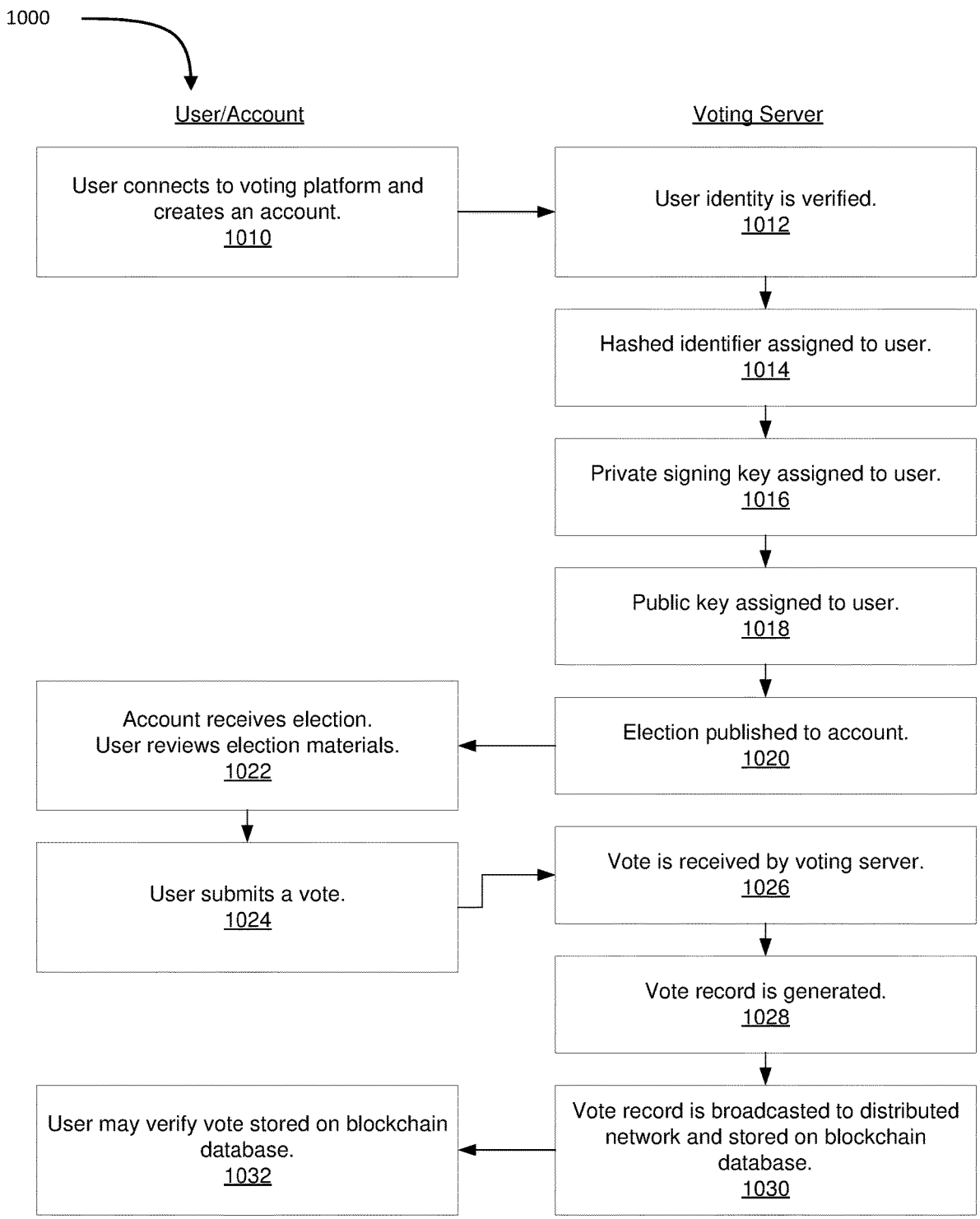
FIG. 10 illustrates a schematic block diagram of a method of voting made in accordance with the teachings and principles of the disclosure.

FIG. 10 is a flow chart diagram of a method for crowdsourcing an outcome to an issue 1000. The method 1000 begins and a user connects to a voting platform facilitated by a voting server 1010. The user creates an account on the voting server. The voting server verifies the identity of the user 1012. In an embodiment, the voting server verifies the user's identity through a plurality of identifiers, including, for example, the user's social security number, the user's date of birth, the user's home address, the user's phone number, by way of asking the user to answer questions concerning the user's credit history, the user's citizenship records, and so forth. In an embodiment, the voting server verifies that the user is eligible to vote in an election such as a government election, an administrative election, or a business administration election. In such an embodiment, the voting server may verify that the user is registered to vote in a particular governmental voting precinct. In an embodiment, the voting server may verify that the user is a voting member of a private institution such as a business or corporation.

The method 1000 continues and the voting server assigns a hashed identifier to the user 1014. In an embodiment, the hashed identifier is based on at least one of: a social security number of the user, a birthdate of the user, a password created by or assigned to the user, and a voter identification number of the user. In an embodiment, the voting server informs the user of the hashed identifier.

The method 1000 continues and the voting server assigns a private signing key to the user 1016. The private signing key may be attached to voting data received from the user to created signed voting data. The signed voting data may be verified as authentic by the plurality of notes connected in a blockchain database. In an embodiment, the voting server informs the user of the private signing key and instructs the user to keep the private signing key completely private from other persons. In an embodiment, the voting server does not inform the user of the private signing key.

The method 1000 continues and the voting server assigns a public key to the user 1018. The public key may be attached to voting data received from the user to indicate that the vote was submitted by a particular user. In an embodiment, a user may look up a vote based on the user's public key. In an embodiment, the private signing key and the public key must match and be assigned to the same user for the vote to be authenticated.

The method 1000 continues and the voting server publishes and election to the account 1020. The election may include one or more candidates, issues, and amendments to be voted on. The election may further include additional information such as background information on the candidates or issues, opinion pieces about the candidates or issues, platform information received about the candidates or issues, and so forth. The election may further include notes saved by the user to be accessed when the user is voting.

The method 1000 continues and the account receives the election. The user reviews the election materials 1022. The user may submit a vote in the election 1024. The vote is received by the voting server 1026. The voting server generates a vote record for the voting data 1028. In an embodiment, the record includes one or more of: the hashed identifier assigned to the user, the public key assigned to the user, the voting data submitted by and received from the user, a prior record hashed identifier from a prior record stored in the blockchain database, an actor identifier indicating an entity performing an action, a target identifier indicating an entity receiving the action, and a stamp indicating a date and time the voting data was received.

The method 1000 continues and the voting server broadcasts the vote record to a distributed network such that the vote record is stored in a blockchain database 1030. The method 1000 continues and the user may view and verify that the vote was correctly stored on the blockchain database 1032.

In a further embodiment, the user may submit a new vote for the same election. A new vote record will be generated for the new vote and the new vote record will be broadcasted to the distributed network to be stored on the blockchain database. In an embodiment, the original vote is not deleted from the blockchain database and the new vote record overrides the original vote. In an embodiment, a user may submit a plurality of revised votes until the election is closed.

Figure 11:
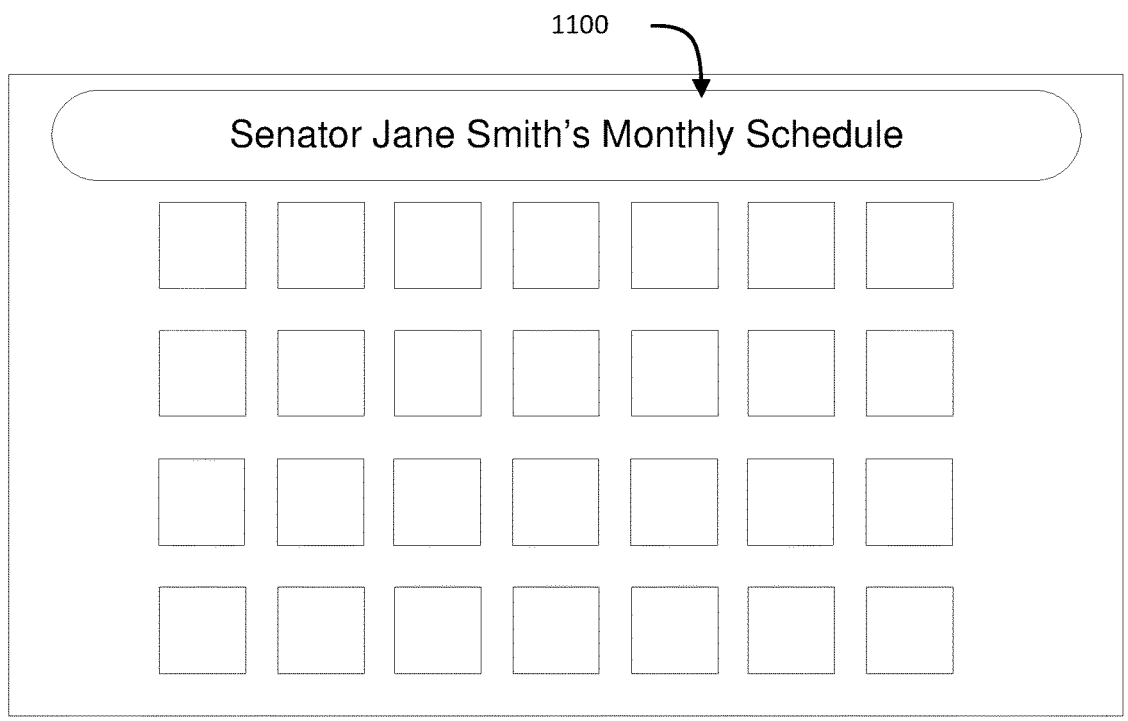
FIG. 11 illustrates an example user interface for a voting platform made in accordance with the teachings and principles of the disclosure.

FIG. 11 illustrates an example embodiment of a user interface according to the present disclosure. In an embodiment, the voting server provides an updated schedule 1100 for a representative such as a government elected official. A user may view the representative's schedule 1100 and verify that the representative attended certain meetings. Such an embodiment may be desirable where users wish to have further transparency in government and other administrative institutions.

Figure 12:
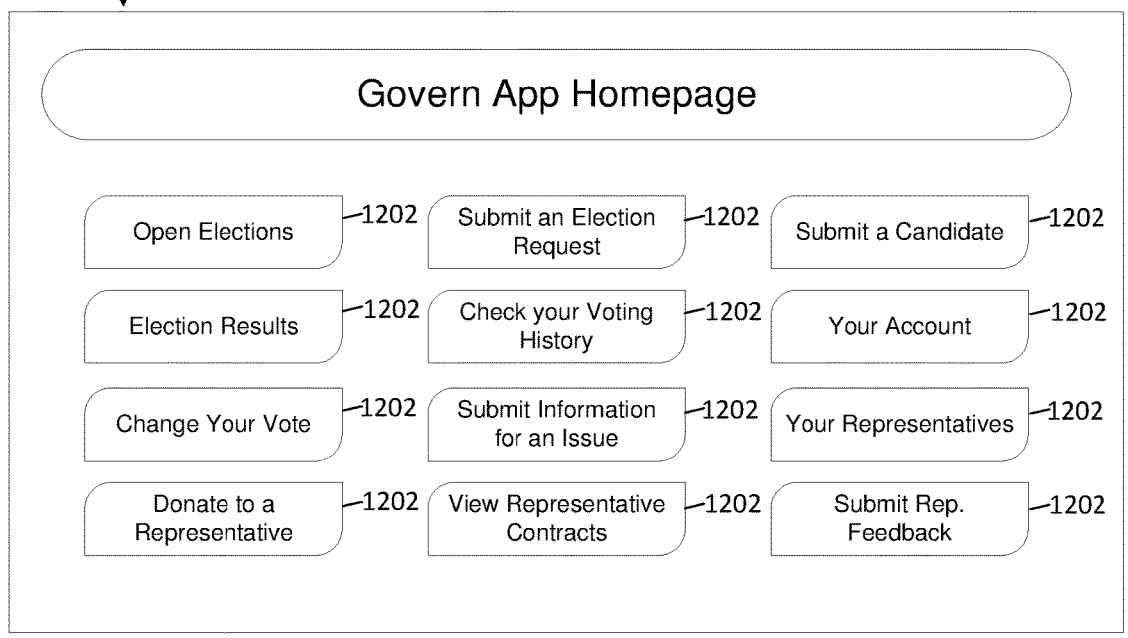
FIG. 12 illustrates an example user interface for a voting platform made in accordance with the teachings and principles of the disclosure.

FIG. 12 illustrates an example embodiment of a user interface according to the present disclosure. A homepage 1200 of the voting platform may include a plurality of options 1202 to be selected by a user. In an embodiment, a user may select to view "open elections." Open elections may include any elections eligible to receive votes at that time. Elections may include, for example, candidate elections for public or private office, elections to determine public opinion on an issue, elections to determine public opinion on an amendment or proposed law, and so forth.

A user may select to view "submit an election request" and the user may then submit a request for an election to be conducted by the voting server. Such an embodiment may be beneficial where a user wishes to determine public opinion on a specific issue or to urge an elected official to act on a specific issue based on the resulting election results. In an embodiment, a plurality of users associated with a plurality of accounts may view the election request, submit alterations to the election request, submit data or opinion pieces relating to the election request, indicate approval of the election request, and so forth.

In an embodiment, a user may select to view "submit a candidate" and the user may then submit a candidate to run for a public or private office within the voting platform. A user may select to view "election results" and then view results for any election that has closed. In an embodiment, a user may view ongoing results in real-time for an election that has not yet closed. The user may select to view "check your voting history" and the user may then view and verify past votes submitted by the user. The user may verify that votes were received correctly and are properly stored in the blockchain database.

In an embodiment, the user may select to view "your account" and may view account information pertaining to that user's particular account. Such account information may include, for example, the user's personal identification information, the user's hashed identifier, the user's public and/or private keys, the user's past voting history, the user's demographic information, the user's contact information, the user's donation history, and so forth. The user may further select to view "change your vote" and may then submit a new and revised vote for an election that has not yet closed.

In an embodiment, a user may select to view "submit information for an issue" and the user may then submit information for a particular issue, candidate, amendment, or other topic. Such information may include, for example, an opinion piece, a fact-based piece, a news article, survey information, background information and so forth. In an embodiment, a user may submit an article detailing why the user supports or opposes a particular proposal. In a further embodiment, a plurality of users associated with a plurality of accounts may view the submitted information, may upvote or downvote the submitted information, and may further submit a request to remove the information if it is inappropriate or off-topic. In an embodiment, a user may select to view "your representatives" and may then view information about that user's personal representatives or other representatives. Representatives include, for example, government elected officials, government appointed officials, business or corporate officials or employees, administrative officials, and others. Information concerning representatives includes, for example, the representative's daily schedule, background, opinions, platform, voting history, campaign contribution history, and any other suitable information.

In an embodiment, a user may select to view "donate to a representative" and may contribute to a candidate or representative directly through the voting platform. In an embodiment, a user may select to view "view representative contract" and may then see if a representative is contractually bound to vote in a legally binding manner according to the representative's constituents as indicated by the election results published by the voting platform. The user may further select to view "submit representative feedback" and the user may contact a representative directly.

Figure 13:
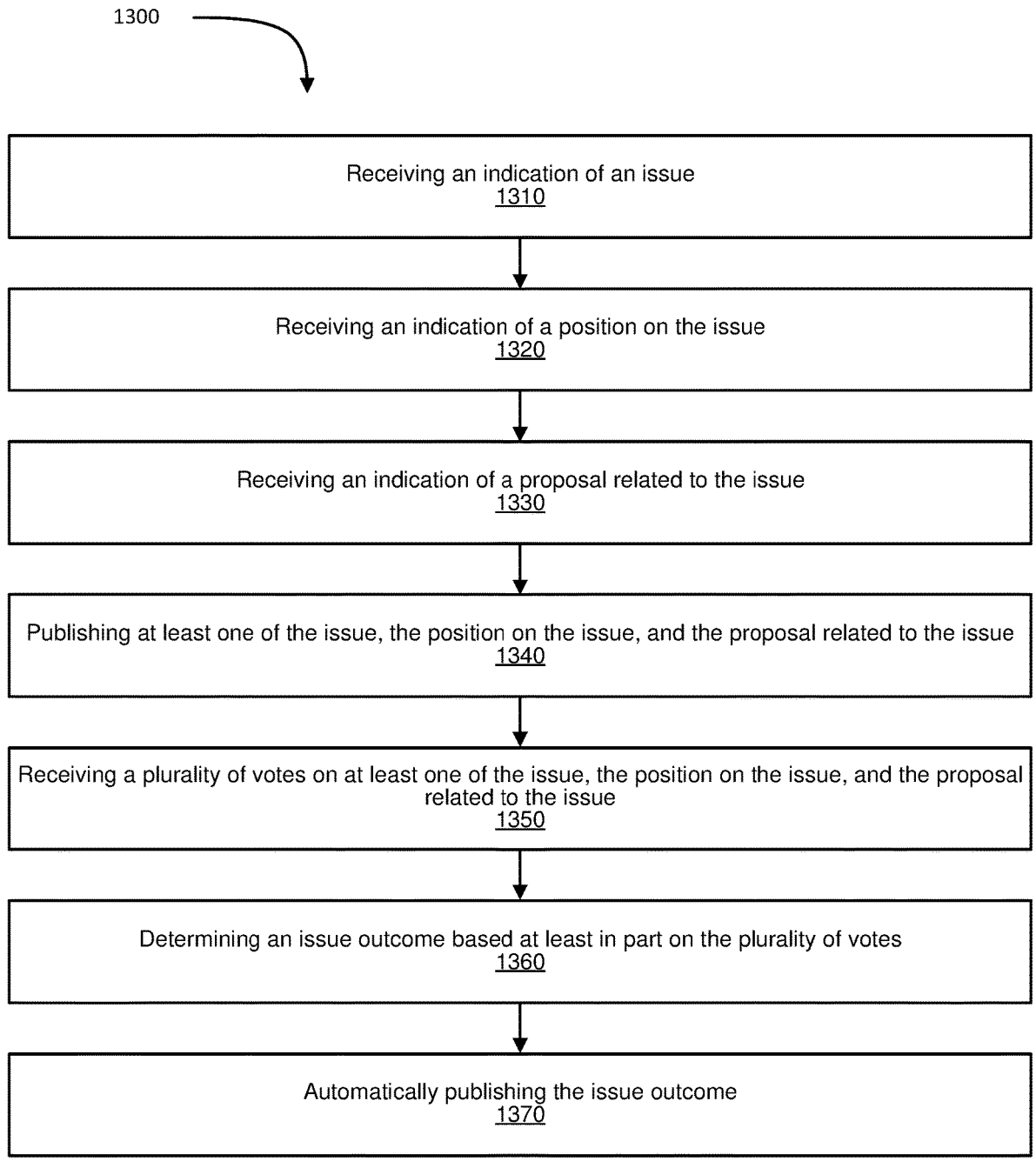
FIG. 13 illustrates a schematic flow chart diagram of a method of voting made in accordance with the teachings and principles of the disclosure.

FIG. 13 is a block diagram of a method of crowdsourcing a determination of an issue 1300 according to one embodiment. The method 1300 begins and a server receives an indication of an issue at 1310, for example an indication that an office holder will vote on pending legislation on a specified date. The server receives an indication of a position on the issue at 1320, for example an indication that the office holder is in favor of the pending legislation. The server receives an indication of a proposal related to the issue at 1330, for example an indication that a constituent believes the office holder should submit an amendment to the legislation. The server publishes at least one of: the issue, the position on the issue, and the proposal related to the issue at 1340. The server receives a plurality of votes on at least one of the issue, the position on the issue, and the proposal related to the issue at 1350. An issue outcome generator (e.g., 114 in FIG. 1) determines an issue outcome based at least in part on the plurality of vote at 1360. The server automatically generates and publishes the issue outcome at 1370.

In an implementation, the method 1300 illustrated in FIG. 13 is a method for governing, for example, a government organization, a business, an administrative agency, or any other organization. The method 1300 may permit a plurality of persons to, for example, vote on a particular issue at 1350. The method may include publishing the outcome of the issue at 1370, including automatically amending the rules and regulations of an organization or indicating to an office holder how the office holder should govern.

Figure 14:
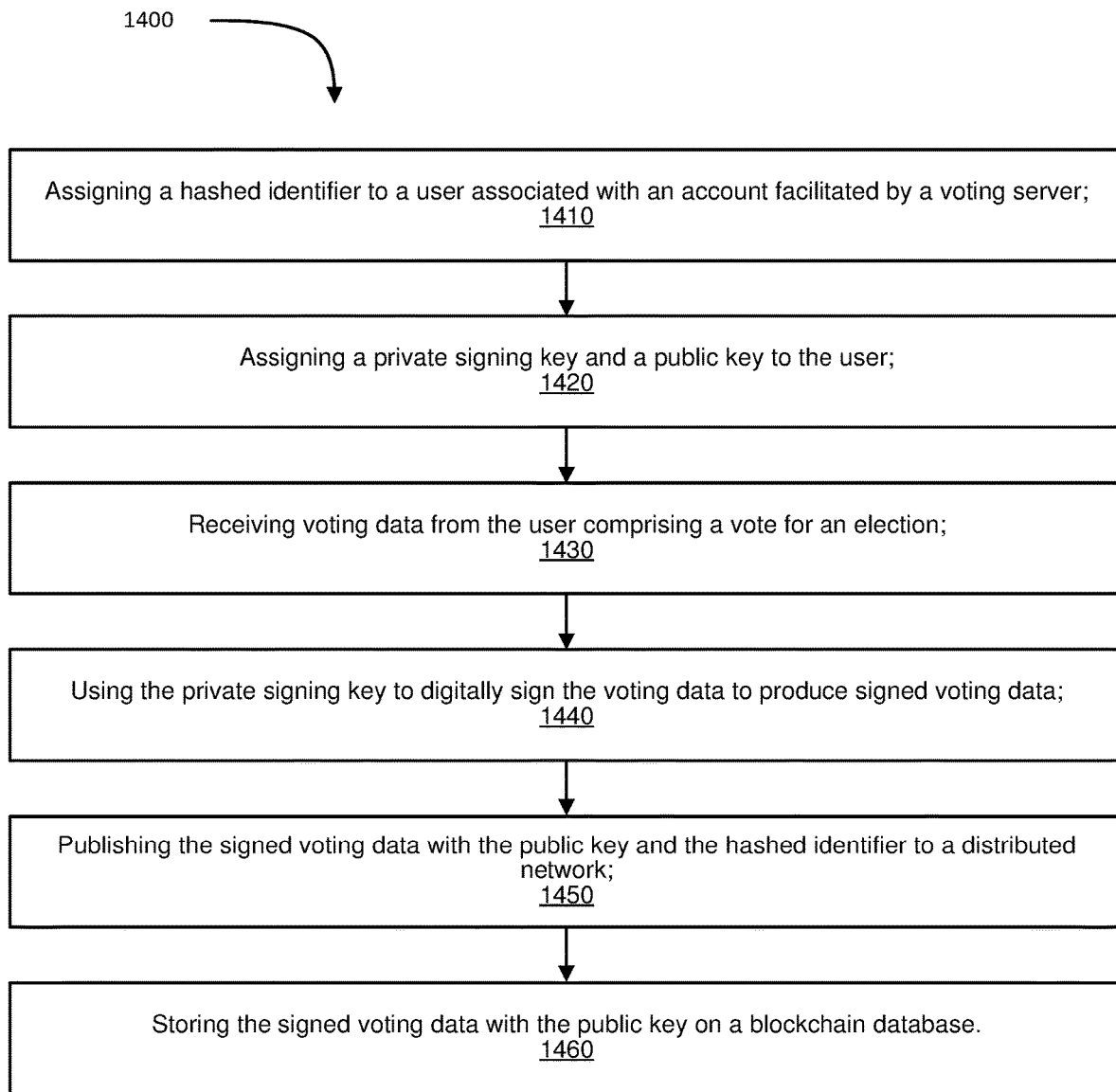
FIG. 14 illustrates a schematic flow chart diagram of a method of voting made in accordance with the teachings and principles of the disclosure.

FIG. 14 illustrates a method 1400 for crowdsourcing an outcome to an issue. The method 1400 begins and a voting server assigns a hashed identifier to a user associated with an account facilitated by the voting server 1410. The voting server assigns a private signing key and a public key to the user 1420. The voting server receives voting data from the user comprising a vote for an election 1430. The voting server uses the private signing key to digitally sign the voting data to produce signed voting data 1440. The voting server publishes the signed voting data with the public key and the hashed identifier to a distributed network 1450. The voting server stores the signed voting data with the public key on a blockchain database 1460.

Figure 15:
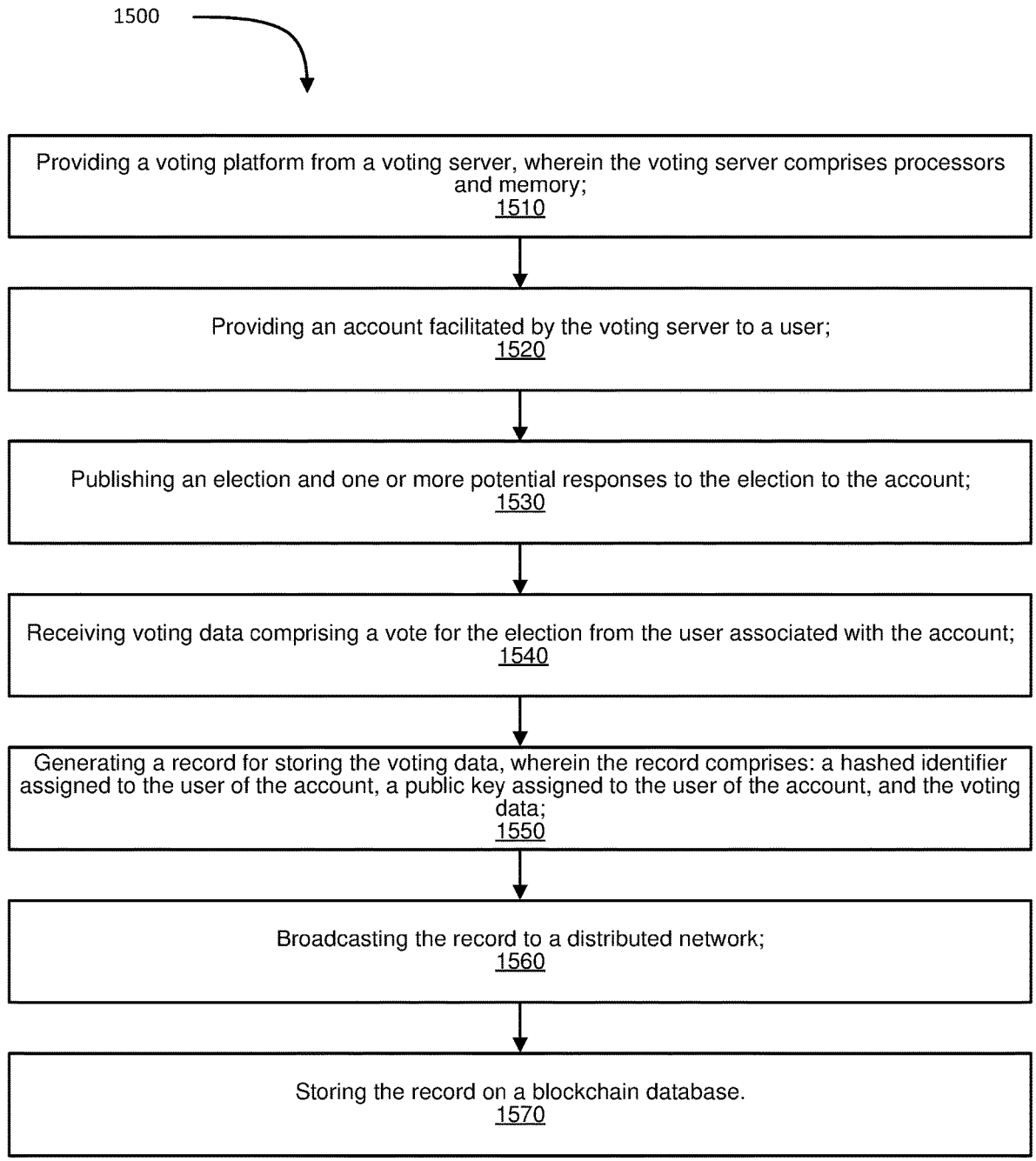
FIG. 15 illustrates a schematic flow chart diagram of a method of voting made in accordance with the teachings and principles of the disclosure.

FIG. 15 illustrates a method 1500 for crowdsourcing an outcome to an issue. The method 1500 beings and a voting server comprising processors and memory provides a voting platform 1510. The voting server provides an account facilitated by the voting server to a user 1520. The voting server publishes an election and one or more potential responses to the election to the account 1530. The voting server receives voting data comprising a vote for the election from the user associated with the account 1540. The voting server generates a record for storing the voting data, wherein the record comprises: a hashed identifier assigned to the user of the account, a public key assigned to the user of the account, and the voting data 1550. The voting server broadcasts the record to a distributed network 1560. The voting server stores the record on a blockchain database 1570.

For purposes of illustration, programs and other executable program components are shown herein as discrete blocks, although it is understood that such programs and components may reside at various times in different storage components of computing device 900, and are implemented in hardware, or a combination of hardware, software, and/or firmware. For example, one or more application specific integrated circuits (ASICs) can be programmed to carry out one or more of the systems and procedures described herein.

Example Voter Identifier Construction

The following example pertains to an embodiment of constructing a voter identification. In an embodiment, any election item, such as a bill, petition, candidate election, and so forth, is created in the voting server and will be identified by an election hash code assigned to the item. An example election hash code includes:

01/30/1980,123-45-6789, Password, 123456789-FL->SHA-512-
>D68F0CA21D162E4BD3ACAE40713C728B7A9B
795DBE32442D910517902E25FD0D40426097F31
B38D8CDAEE0B6EF6CABF1F2AC50A9F2C5586
E0726CD9A6A2F0BA0

In an embodiment, all data is tracked in a series of data blocks or records. Each record may appear as follows:

| | |
|---|---|
| PriorHash | The SHA3-512 hashed identifier of the prior record. |
| Stamp | The date & time that the record was created. |
| Signature | A signature of the data generated by the actor with the user's private signing key. |
| Actor | The VoterIdentifier or entity initiating an action. The VoterIdentifier may include a hashed identifier or public key associated with a user. |
| Target | The entity being acted upon or the resulting identifier from the action. |
| Action | An indication of the action being taken. Actions include, for example, registering a new voter, casting a vote, submitting a petition, revising a vote, and so forth. |
| DataFormat | An indicator of how the data segment is stored, for example, encoded XML, JSON, or MIME |
| Data | BASE64 encoded Data (MIME, XML, JSON) needed to perform the prescribed action |
| Hash | SHA3-512 hashed identifier of the current record where each field is separated by a comma PriorHash, Stamp, Signature, Actor, Target, Action, DataFormat, Data |

It should be appreciated that the record may comprise a string of a plurality of data fields. Each of the plurality of data fields may be delineated by a space, comma, period, other punctuation, and so forth, or the data fields may not be delineated.

In an embodiment, after a record is created, the record becomes immutable. The record cannot be changed. Any attempt to change the record will result in a change to the record's hash code, resulting in each subsequent record being rendered invalid.

Revision Flow of an Item or Election

The following example pertains to revision flow of an item, such as a bill, petition, amendment, and so forth, according to one embodiment. In an embodiment, an item, such as a bill, petition, amendment, candidate election, and so forth, is created by a user. The user may revise the item, and alternatively the item may be published to the voting platform and a plurality of users associated with a plurality of accounts may revise the item.

In an embodiment, the actor identifier indicates the user initiating a change to the item. The target identifier indicates the hash code identifier of the original item. The action code is set to "revising". The data is set to the revised item. In an embodiment, the new item is assigned to a new hash code identifier and may now be further revised or voted upon.

In an embodiment, any activities or actions take by the system or voting server will utilize the hash code identifier of:
00000000000000000000000000000000000000000000000000000000000000000000000000000000000000000000000000000000000000000000000000000000.

In an embodiment, the system or voting server creates a first user as follows. The data block before Base64 encoding would be:

```
<?xml version="1.0" encoding="utf-8"?>
<createvoter><voteridentifier>D68F0CA21D162E4BD3ACAE40713C728B7A9B795DBE32442D910517902E25FD0D40426097F31B38D8CDAEE0B6EF6CABF1F2AC50A9F2C5586E0726CD9A6A2F0BA0</voteridentifier><sig>SamplePublicKey</sig></createvoter>
```

| | |
|---|---|
| PriorHash | 0 |
| Stamp | 2017-01-01 00:00:00.0000000 -05:00 |
| Signature | |
| Actor | 0000000000000000000000000000000000000000000000000000000000000000000000000000000000000000000000000000000000000000000000000000000000 |
| Target | D68F0CA21D162E4BD3ACAE40713C728B7A9B795DBE32442D910517902E25FD0D40426097F31B38D8CDAEE0B6EF6CABF1F2AC50A9F2C5586E0726CD9A6A2F0BA0 |
| Action | 1 |
| DataFormat | XML |
| Data | PD94bWwgdmVyc2lvbj0iMS4wIiBlbmNvZGluZz0idXRmLTgiPz4KPGNyZWF0ZXZvdGVyPjx2b3RlcmlkZW50aWZpZXI+RDY4RjBDQTIxRDE2MkU0QkQzQUNBRTQwNzEzQzcyOEI3QTlCNzk1REJFMzI0NDJEOTEwNTE3OTAyRTI1RkQwRDQwNDI2MDk3RjMxQjM4RDhDREFFRTBCNkVGNkNBQkYxRjJBQzUwQTlGMkM1NTg2RTA3MjZDRDlBNkEyRjBCQTA8L3ZvdGVyaWRlbnRpZmllcj48c2lnPlNhbXBsZVB1YmxpY0tlwvc2lnPjwvY3JlYXRldm90ZXI+Cg== |
| Hash | 5AF91B90A464A16474E9489A0735524F9E375FF28DC8066F093E9BDC65F3D5B7EB19E3170B3BAC7ABEB57A099367C200EDCA22D8D42C4274E6180A0941B6383E |

In an embodiment, the data to create a hash code identifier includes the following.

0,2017-01-01 00:00:00.0000000-05:00, 000000000000000000000000000000000000000000000000000000000000000000000000000000000000000000000000000000000000000000000000000000,D68F0CA21D162E4BD3ACAE40713C728B7A9B795DBE32442D910517902E25FD0D40426097F31B38D8CDAEE0B6EF6CABF1F2AC50A9F2C5586E0726CD9A6A2F0BA0,1,XML, PD946WwgdmVyc2lvbj0iMS4wIiBlbmNvZGluZz0idXRmLTgiPz4KPGNyZWFOZXZvdGVyPjx2b3RlcmlkZW50aWZpZXI+RDY4RjBDQTIxRDE2MkU0QkQzQUNBRTQwNzEz,QzcyOEI3QT1CNzk1REJFMzI0NDJEOTEwNTE3OTAyRTI1RkQwRDQwNDI2MDk3RjMxQjM4RDhDREVFRTBCNkVGNkNBQkYxRjBCQzUwQT1GMkM1NTg2RTA3MjZDRD1BNkEy, RjBCQTA8L3ZvdGVyaWRlbnRpZmllcj48c2lnblNhbXBsZVB1Ymxpc1Y0tleTwvc2lnPjwvY3JlYXRldm9ZXI+Cg==, This may create a user in the voting server with the VoterIdentifier:

D68F0CA21D162E4BD3ACAE40713C728B7A9B795 DBE32442D910517902E25FD0D40426097F31B38 D8CDAEE0B6EF6CABF1F2AC50A9F2C5586E07 26CD9A6A2F0BA0

In an embodiment, if a user submits a new vote to override a previously cast vote, the new vote record would include the following.

| | |
|---|---|
| PriorHash | 807937F66505531561935E05CF12CB1C5A2370C05C6B71CC9A8FD66118 3B91AD4EF9B5A67B93A011825797E708C84A32D5457BA59A8E3EC300 69A4656E27229A |
| Stamp | 2017-01-01 00:03:00.0000000 -05:00 |
| Signature | SAMPLESIGNATURE |
| Actor | D68F0CA21D162E4BD3ACAE40713C728B7A9B795DBE32442D91051790 2E25FD0D40426097F31B38D8CDAEE0B6EF6CABF1F2AC50A9F2C5586 E0726CD9A6A2F0BA0 |
| Target | 8AE49E862C4146AD23506F724EB402B400FA9A72089C61607F8D7B9D6 45CF07C53BC64E1EA353E915D9C9E29811BEDB25CBE0DC248716EC44 B8A17AFBC6F8FB2 |
| Action | 2 |
| DataFormat | JSON |
| Data | eyJ2b3RlZGlyZWNOaW9uIjogImZvciIsInZvdGUiOiAtMX0= |
| Hash | 505BC9C1C84E1DF973CAFC2A9F7993F8F733AAA2097F064AA9A82CB 823F4FFE3F26F46A623251A2A4AFBCA50B07E68DAA76D81DC21849F0 AF2F2988B9E79BD70 |

The data to create the final has according to the new vote may include the following:

807937F66505531561935E05CF12CB1C5A2370C05 C6B71CC9A8FD661183B91AD4EF9B5A67B93A0 11825797E708C84A32D5457BA59A8E3EC30069A 4656E27229A,2017-01-01 00:03:00.0000000-05:00, SAMPLESIGNATURE, D68F0CA21D162E4BD3ACAE40713C728B7A9B7 95DBE32442D910517902E25FD0D40426097F31B 38D8CDAEE0B6EF6CABF1F2AC50A9F2C5586E 0726CD9A6A2F0BA0, 8AE49E862C4146AD23506F724EB402B400FA9A 72089C61607F8D7B9D645CF07C53BC64E1EA35 3E915D9C9E29811BEDB25CBE0DC248716EC44 B8A17AFBC6F8FB2,2,JSON, eyJ2b3RlZGlyZWN0aW9uIjogImZvciIsInZvdGUiO iAtMX0=, It should be appreciated that a plurality of records may be counted and recorded to determine an outcome to an election. In an embodiment, each of the plurality of records comprises an identifier associated with the record with an election. Any of, for example, a user, a third party, a node, a plurality of nodes, and the voting server may verify and count each of the records associated with the election and determine an outcome to the election. Each of the individual records is verifiable by the blockchain database by way of the prior hashed identifier from a prior record that is attached to each new record. It should be appreciated that the voting server 112 may publish the outcome to the election to one or more accounts, to a third party, to a node, and so forth.

In a further embodiment, the voting platform comprises an officer account. An officer account may be associated with a user having, for example, decision-making capabilities or responsibilities in a public or private governing platform such as a legislative body, an administrative governing body, a business or corporation governing body, and so forth. In an embodiment the user is an elected official that is contractually obligated to act in accordance with the results of elections determined within the voting platform.

In such an embodiment, the voting server publishes the outcome to the election to the officer account. In a further embodiment, the voting server receives an indication from the officer account that the user with decision-making capabilities has acted in accordance with the outcome to the election or has not acted in accordance with the outcome to the election. The indication may alternatively be received from one or more non-officer accounts, pulled from news sources or public updates, pulled from a public or private voting record, and so forth. The indication may be published to a plurality of accounts. One or more accounts may manually or automatically subscribe to receive such indications. For example, a constituent of an elected official may automatically receive such an indication.

EXAMPLES

The following examples pertain to further embodiments.

Example 1 is a method. The method includes providing a voting platform from a voting server, wherein the voting server comprises processors and memory. The method includes providing an account facilitated by the voting server to a user. The method includes publishing an 1election and one or more potential responses to the election to the account and receiving voting data comprising a vote for the election from the user associated with the account. The method includes generating a record for storing the voting data, wherein the record comprises: a hashed identifier assigned to the user of the account, a public key assigned to the user of the account, and the voting data. The method includes broadcasting the record to a distributed network and storing the record on a blockchain database.

Example 2 is a method as in Example 1, wherein the record further comprises a prior record hashed identifier from a prior record stored in the blockchain database.

Example 3 is a method as in any of Examples 1-2, wherein the record further comprises an actor identifier indicating an entity performing an action.

Example 4 is a method as in any of Examples 1-3, wherein the record further comprises a target identifier indicating an entity receiving the action.

Example 5 is a method as in any of Examples 1-4, wherein the record further comprises a stamp indicating a date and time the voting data was received.

Example 6 is a method as in any of Examples 1-5, further comprising assigning a private signing key to the user and attaching the private signing key to the voting data to create signed voting data.

Example 7 is a method as in any of Examples 1-6, wherein the record further comprises an indication of a data format for the record.

Example 8 is a method as in any of Examples 1-7, further comprising generating the hashed identifier based on at least one of: a social security number of the user, a birthdate of the user, a password, and a voter identification number of the user.

Example 9 is a method as in any of Examples 1-8, further comprising receiving an election request from the user associated with the account and assigning an election hashed identifier to the election request, wherein the election request indicates an issue or candidate to be voted upon.

Example 10 is a method as in any of Examples 1-9, further comprising receiving a revision to the election request from one or more users associated with one or more accounts.

Example 11 is a method as in any of Examples 1-10, further comprising publishing the election to the account when the election is open and receiving voting data, such that the user of the account may view the election.

Example 12 is a method as in any of Examples 1-11, further comprising determining an outcome to the election based on a plurality of voting data received from a plurality of users associated with a plurality of accounts.

Example 13 is a method as in any of Examples 1-12, further comprising publishing the outcome to the election to the plurality of accounts.

Example 14 is a method as in any of Examples 1-13, further comprising receiving revised voting data from the user associated with the account, wherein the revised voting data comprises a revised vote that replaces the vote for the election.

Example 15 is a method as in any of Examples 1-14, further comprising generating a new record for storing the revised voting data, wherein the new record comprises: an actor identifier indicating the user, a target identifier indicating the voting data, an action identifier indicating the revised voting data comprises a revision, the revised voting data.

Example 16 is a method as in any of Examples 1-15, further comprising broadcasting the new record to the distributed network and storing the new record on the blockchain database.

Example 17 is a method as in any of Examples 1-16, wherein the record comprises a plurality of data fields selected from a list comprising: a prior record hashed identifier from a prior record stored on the blockchain database, a stamp comprising a date and time, a signature, an actor identifier indicating an entity initiating an action, a target identifier indicating an entity receiving the action, an action code indicating a type of action being taken, a data format, and encoded data.

Example 18 is a method as in any of Examples 1-17, wherein the election comprises an issue and the one more potential responses comprise at least one of support of the issue and opposition to the issue.

Example 19 is a method as in any of Examples 1-18, further comprising publishing one or more of a message in support of the issue and a message in opposition to the issue to the account.

Example 20 is a method as in any of Examples 1-19, wherein the vote for the election indicates the user has indicated one or more of: support of the issue or opposition to the issue.

Example 21 is a method as in any of Examples 1-20, further comprising determining an outcome to the election based on a plurality of votes received from a plurality of accounts.

Example 22 is a method as in any of Examples 1-21, further comprising publishing the outcome to the issue to an officer account associated with a user having decision-making responsibilities in one or more of: a government institution, an administrative institution, and a business institution.

Example 23 is a method as in any of Examples 1-22, further comprising receiving an indication from the officer account that the user having decision-making capabilities has acted in accordance with the outcome to the issue or has not acted in accordance with the outcome to the issue.

Example 24 is a method as in any of Examples 1-23, further comprising publishing the indication from the officer account to the plurality of accounts facilitated by the voting server.

Example 25 is a method as in any of Examples 1-24, further comprising publishing a political election to the account, wherein the political election comprises one or more candidates running for one or more political offices.

Example 26 is a method as in any of Examples 1-25, further comprising publishing an officer schedule to the account, wherein the officer schedule comprises a daily appointment schedule of a person having decision-making capabilities in one or more of: a government institution, an administrative institution, and a business institution.

Example 27 is a method. The method includes assigning a hashed identifier to a user associated with an account facilitated by a voting server. The method includes assigning a private signing key and a public key to the user. The method includes receiving voting data from the user comprising a vote for an election and using the private signing key to digitally sign the voting data to produce signed voting data. The method includes publishing the signed voting data with the public key and the hashed identifier to a distributed network and storing the signed voting data with the public key on a blockchain database.

Example 28 is a method as in Example 27, further comprising generating a record for storing the voting data, wherein the record comprises: a prior record hashed identifier from a prior record stored in the blockchain database, the hashed identifier, the public key, and the signed voting data.

Example 29 is a method as in any of Examples 27-28, wherein the record further comprises an actor identifier indicating an entity performing an action.

Example 30 is a method as in any of Examples 27-29, wherein the record further comprises a target identifier indicating an entity receiving the action.

Example 31 is a method as in any of Examples 27-30, wherein the record further comprises a stamp indicating a date and time the voting data was received.

Example 32 is a method as in any of Examples 27-31, further comprising generating the hashed identifier based on at least one of: a social security number of the user, a birthdate of the user, a password, and a voter identification number of the user.

Example 33 is a method as in any of Examples 27-32, further comprising receiving an election request from the user associated with the account and assigning an election hashed identifier to the election request, wherein the election request indicates an issue or candidate to be voted upon.

Example 34 is a method as in any of Examples 27-33, further comprising publishing the election request to the voting server such that a plurality of users associated with a plurality of accounts may view the election request.

Example 35 is a method as in any of Examples 27-34, further comprising receiving one or more modification requests pertaining to the election request from one or more accounts facilitated by the voting server.

Example 36 is a method as in any of Examples 27-35, further comprising publishing the election, wherein the election is based one or more of the election request and the one or more modification requests pertaining to the election request.

Example 37 is a method as in any of Examples 27-36, further comprising receiving revised voting data from the user associated with the account, wherein the revised voting data comprises a revised vote that replaces the vote for the election.

Example 38 is a method as in any of Examples 27-37, further comprising: using the private signing key to digitally sign the revised voting data to produce signed revised voting data, publishing the signed revised voting data with the public key and the hashed identifier to the distributed network, and storing the signed revised voting data with the public key on the blockchain database.

Example 39 is a method as in any of Examples 27-38, wherein an attempt to change the signed voting data after it has been stored in the blockchain database causes a change to the record and renders any subsequent record invalid.

Example 40 is a system. The system includes a voting server comprising a voting platform and further comprising processors and memory for executing computing instructions. The system includes an account associated with a user and facilitated by the voting server. The system includes an election generated by the voting platform comprising one or more of: a candidate to be voted on, an issue to be voted on, and one or more potential responses. The system includes a plurality of nodes comprising processors and memory connected in a distributed network to form a blockchain database, wherein the plurality of nodes is in electronic communication with the voting server. The system is such that the voting server publishes the election to the account and receives voting data from the user indicating a vote for the election and the voting server broadcasts the voting data to the plurality of nodes to be stored on the blockchain database.

The foregoing description has been presented for the purposes of illustration and description. It is not intended to be exhaustive or to limit the disclosure to the precise form disclosed. Many modifications and variations are possible in light of the above teaching. Further, it should be noted that any or all of the aforementioned alternate implementations may be used in any combination desired to form additional hybrid implementations of the disclosure.

Further, although specific implementations of the disclosure have been described and illustrated, the disclosure is not to be limited to the specific forms or arrangements of parts so described and illustrated. The scope of the disclosure is to be defined by the claims appended hereto, any future claims submitted here and in different applications, and their equivalents.

In the foregoing Detailed Description, various features of the disclosure are grouped together in a single implementation for the purpose of streamlining the disclosure. This method of disclosure is not to be interpreted as reflecting an intention that the claimed disclosure requires more features than are expressly recited in each claim. Rather, as the following claims reflect, inventive aspects lie in less than all features of a single foregoing disclosed implementation. Thus, the following claims are hereby incorporated into this Detailed Description by this reference, with each claim standing on its own as a separate implementation of the disclosure.

It is to be understood that the above-described arrangements are only illustrative of the application of the principles of the disclosure. Numerous modifications and alternative arrangements may be devised by those skilled in the art without departing from the spirit and scope of the disclosure and the appended claims are intended to cover such modifications and arrangements. Thus, while the disclosure has been shown in the drawings and described above with particularity and detail, it will be apparent to those of ordinary skill in the art that numerous modifications, including, but not limited to, variations in size, materials, shape, form, function and manner of operation, assembly and use may be made without departing from the principles and concepts set forth herein.

What is claimed is:

1. A method comprising:
providing a voting platform from a voting server, wherein the voting server comprises processors and memory;
providing an account facilitated by the voting server to a user;
publishing an election and one or more potential responses to the election to the account;
receiving voting data comprising a vote for the election from the user associated with the account;
generating a record for storing the voting data on a blockchain database, wherein the record comprises:
a hashed identifier assigned to the user of the account;
a public key assigned to the user of the account; and
the voting data;
broadcasting the record to a distributed network and storing the record on the blockchain database;
receiving revised voting data comprising a revised vote for the election from the user associated with the account prior to a closing date for the election;
generating a new record for storing the revised voting data on the blockchain database, wherein the new record comprises:
the hashed identifier assigned to the user of the account;
the public key assigned to the user of the account; and
the revised voting data; and
broadcasting the new record to the distributed network and storing the new record on the blockchain database;
wherein each of the record and the new record are immutably stored on the blockchain database.

2. The method of claim 1, wherein the record further comprises a prior record hashed identifier from a prior record stored in the blockchain database.

3. The method of claim 1, wherein the record further comprises an actor identifier indicating an entity performing an action.

4. The method of claim 3, wherein the record further comprises a target identifier indicating an entity receiving the action.

5. The method of claim 1, wherein the record further comprises a stamp indicating a date and time the voting data was received.

6. The method of claim 1, further comprising assigning a private signing key to the user and attaching the private signing key to the voting data to create signed voting data.

7. The method of claim 1, wherein the record further comprises an indication of a data format for the record.

8. The method of claim 1, further comprising generating the hashed identifier based on at least one of: a social security number of the user, a birthdate of the user, a password, and a voter identification number of the user.

9. The method of claim 1, further comprising receiving an election request from the user associated with the account and assigning an election hashed identifier to the election request, wherein the election request indicates an issue or candidate to be voted upon.

10. The method of claim 9, further comprising receiving a revision to the election request from one or more users associated with one or more accounts.

11. The method of claim 1, further comprising publishing the election to the account when the election is open and receiving voting data, such that the user of the account may view the election.

12. The method of claim 1, further comprising determining an outcome to the election based on a plurality of voting data received from a plurality of users associated with a plurality of accounts.

13. The method of claim 12, further comprising publishing the outcome to the election to the plurality of accounts.

14. The method of claim 1, wherein the new record further comprises:
   an actor identifier indicating the user;
   a target identifier indicating the voting data; and
   an action identifier indicating the revised voting data comprises a revision.

15. The method of claim 14, further comprising broadcasting the new record to the distributed network and storing the new record on the blockchain database.

16. The method of claim 1, wherein the record comprises a plurality of data fields selected from a list comprising: a prior record hashed identifier from a prior record stored on the blockchain database, a stamp comprising a date and time, a signature, an actor identifier indicating an entity initiating an action, a target identifier indicating an entity receiving the action, an action code indicating a type of action being taken, a data format, and encoded data.

17. The method of claim 1, wherein the election comprises an issue and the one more potential responses comprise at least one of support of the issue and opposition to the issue.

18. The method of claim 17, further comprising publishing one or more of a message in support of the issue and a message in opposition to the issue to the account.

19. The method of claim 18, wherein the vote for the election indicates the user has indicated one or more of: support of the issue or opposition to the issue.

20. The method of claim 19, further comprising determining an outcome to the election based on a plurality of votes received from a plurality of accounts.

21. The method of claim 20, further comprising publishing the outcome to the issue to an officer account associated with a user having decision-making responsibilities in one or more of: a government institution, an administrative institution, and a business institution.

22. The method of claim 21, further comprising receiving an indication from the officer account that the user having decision-making capabilities has acted in accordance with the outcome to the issue or has not acted in accordance with the outcome to the issue.

23. The method of claim 22, further comprising publishing the indication from the officer account to the plurality of accounts facilitated by the voting server.

24. The method of claim 1, further comprising publishing a political election to the account, wherein the political election comprises one or more candidates running for one or more political offices.

25. The method of claim 1, further comprising publishing an officer schedule to the account, wherein the officer schedule comprises a daily appointment schedule of a person having decision-making capabilities in one or more of: a government institution, an administrative institution, and a business institution.

26. A method comprising:
   assigning a hashed identifier to a user associated with an account facilitated by a voting server;
   assigning a private signing key and a public key to the user;
   receiving voting data from the user comprising a vote for an election;
   using the private signing key to digitally sign the voting data to produce signed voting data;
   broadcasting the signed voting data with the public key and the hashed identifier to a distributed network;
   storing the signed voting data with the public key on a blockchain database;
   receiving revised voting data comprising a revised vote for the election from the user associated with the account prior to a closing date for the election;
   using the private signing key to digitally sign the revised voting data to produce signed revised voting data;
   broadcasting the revised signed voting data with the public key and the hashed identifier to the distributed network; and
   storing the revised signed voting data with the public key on the blockchain database;
   wherein each of the signed voting data and the revised signed voting data are immutably stored on the blockchain database.

27. The method of claim 21, further comprising generating a record for storing the voting data, wherein the record comprises:
   a prior record hashed identifier from a prior record stored in the blockchain database;
   the hashed identifier;
   the public key; and
   the signed voting data.

28. The method of claim 27, wherein the record further comprises an actor identifier indicating an entity performing an action.

29. The method of claim 28, wherein the record further comprises a target identifier indicating an entity receiving the action.

30. The method of claim 27, wherein the record further comprises a stamp indicating a date and time the voting data was received.

31. The method of claim 21, further comprising generating the hashed identifier based on at least one of: a social security number of the user, a birthdate of the user, a password, and a voter identification number of the user.

32. The method of claim 21, further comprising receiving an election request from the user associated with the account and assigning an election hashed identifier to the election request, wherein the election request indicates an issue or candidate to be voted upon.

33. The method of claim 32, further comprising publishing the election request to the voting server such that a plurality of users associated with a plurality of accounts may view the election request.

34. The method of claim 33, further comprising receiving one or more modification requests pertaining to the election request from one or more accounts facilitated by the voting server.

35. The method of claim 34, further comprising publishing the election, wherein the election is based one or more of the election request and the one or more modification requests pertaining to the election request.

36. The method of claim 21, wherein the revised voting data comprises a revised vote that replaces the vote for the election.

37. The method of claim 36, further comprising generating a revised record for storing the revised voting data, wherein the revised record comprises:

a prior record hashed identifier from a prior record stored in the blockchain database;
the hashed identifier;
the public key; and
the signed voting data.

38. The method of claim 27, wherein an attempt to change the signed voting data after it has been stored in the blockchain database causes a change to the record and renders any subsequent record invalid.

39. A system comprising:
a voting server comprising a voting platform and further comprising processors and memory for executing computing instructions;
an account associated with a user and facilitated by the voting server;
an election generated by the voting platform comprising one or more of: a candidate to be voted on, an issue to be voted on, and one or more potential responses; and
a plurality of nodes comprising processors and memory connected in a distributed network to form a blockchain database, wherein the plurality of nodes is in electronic communication with the voting server;
wherein the voting server publishes the election to the account and receives voting data from the user indicating a vote for the election;
wherein the voting server broadcasts the voting data to the plurality of distributed nodes to be stored on the blockchain database;
wherein the voting server receives revised voting data comprising a revised vote for the election from the user prior to a closing date for the election;
wherein the voting server broadcasts the revised voting data to the plurality of distributed nodes to be stored on the blockchain database;
wherein each of the voting data and the revised voting data are immutably stored on the blockchain database.

* * * * *